(12) United States Patent
Karibe et al.

(10) Patent No.: US 10,503,052 B2
(45) Date of Patent: Dec. 10, 2019

(54) SHUTTER APPARATUS, IMAGE PICKUP APPARATUS, AND CONTROL METHOD FOR THE SHUTTER APPARATUS

(71) Applicant: CANON KABUSHIKI KAISHA, Tokyo (JP)

(72) Inventors: Kazuya Karibe, Kawasaki (JP); Chikara Aoshima, Kawasaki (JP); Masahiro Takayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/921,793

(22) Filed: Mar. 15, 2018

(65) Prior Publication Data

US 2018/0267388 A1 Sep. 20, 2018

(30) Foreign Application Priority Data

Mar. 16, 2017 (JP) .................................. 2017-051134

(51) Int. Cl.
*G03B 9/10* (2006.01)
*H04N 5/235* (2006.01)
*G03B 9/42* (2006.01)
*H04N 5/225* (2006.01)

(52) U.S. Cl.
CPC ................. *G03B 9/10* (2013.01); *G03B 9/42* (2013.01); *H04N 5/2254* (2013.01); *H04N 5/2353* (2013.01)

(58) Field of Classification Search
CPC ........... G03B 9/10; G03B 9/42; H04N 5/2353
USPC ......................................................... 396/493
See application file for complete search history.

(56) References Cited

U.S. PATENT DOCUMENTS

| 2012/0242891 A1* | 9/2012 | Kimura ............... G10L 21/0208 348/357 |
| 2017/0194886 A1* | 7/2017 | Dwersteg .................. H02P 8/04 |
| 2018/0196333 A1 | 7/2018 | Takayama et al. |
| 2018/0241330 A1* | 8/2018 | Byers ........................ H02P 8/36 |

FOREIGN PATENT DOCUMENTS

WO 2015/071988 A1 5/2015

\* cited by examiner

*Primary Examiner* — Clayton E. LaBalle
*Assistant Examiner* — Linda B Smith
(74) *Attorney, Agent, or Firm* — Carter, DeLuca & Farrell LLP

(57) ABSTRACT

A shutter apparatus includes a motor, a cam gear, a driving member, and a blade group. A cam part includes a blade maintaining section configured to maintain one of an open state and a closed state of the blade group when a cam follower slides, and a blade driving section. Where the cam follower slides in the blade maintaining section and the blade driving section in this order, the motor is driven in the micro step driving mode when the cam follower slides in the blade maintaining section, and the motor is driven in the full step driving mode when the cam follower slides in the blade driving section.

8 Claims, 17 Drawing Sheets

SHUTTER APPARATUS, IMAGE PICKUP APPARATUS, AND CONTROL METHOD FOR THE SHUTTER APPARATUS

BACKGROUND OF THE INVENTION

Field of the Invention

The present invention relates to a shutter apparatus, an image pickup apparatus, and a control method for the shutter apparatus.

Description of the Related Art

A focal plane shutter is known as a shutter apparatus for a camera. The focal plane shutter operates a slit formed by two shutter blades (front and rear curtains) so as to continuously expose an image pickup plane. Each shutter blade reciprocates between a closed state that covers an opening in a shutter base plate and an open state that retreats and releases the opening.

A cam member is rotated by driving a motor, this operation enables a cam follower to slide in a cam groove formed in the cam member, and each shutter blade can reciprocate between the closed state and the open state. The cam groove has a first cam area that enables the cam member to move without moving each shutter blade, a second cam area that drives each shutter blade from the closed state to the open state, and a third cam area that enables the cam member to move without moving each shutter blade. Each shutter blade traces or follows the first, second, and third cam areas in this order.

A driving mode for a motor used to operate each shutter blade includes a first motor driving motor that switches an electrification state in a coil in the motor in accordance with a determined time interval, and a second motor driving mode that can detect a position of a rotor in the motor and switch the electrification state of the coil in the motor in accordance with a position detecting result.

PCT International Publication No. 2015/071988 discloses a configuration that drives a motor in a first motor driving mode when a cam follower slides in a first cam area in a cam member and drives the motor in a second motor driving mode when the cam follower slides in a second cam area.

However, the configuration disclosed in PCT International Publication No. 2015/071988 drives the motor in the first motor driving motor when the cam follower slides in the first cam area, and thus may cause a shift between an actual shift and an ideal shift for the motor for each of the predetermined time interval. A period in which the cam follower slides in the first cam area is a runup period from when the cam member starts rotating to when each shutter blade is operated. Thus, due to the phase shift of the motor in this period from the ideal shift, the shutter speed accuracy lowers and a faster shutter speed cannot be realized.

SUMMARY OF THE INVENTION

The present invention provides a shutter apparatus that can be highly accurately driven.

A shutter apparatus or an image pickup apparatus according to one aspect of the present invention includes a motor configured to drive in a full step driving mode that electrifies each phase with a constant electrification amount, and a micro step driving mode that stepwise changes an electrification amount and electrifies each phase, a cam gear connected to an output shaft of the motor and including a cam part, a driving member including a cam follower configured to slide in the cam part, and a blade group configured to move between an open state that opens an opening used for an exposure and a closed state that closes the opening, via the cam gear and the driving member as the motor rotates. The cam part includes a blade maintaining section configured to maintain one of the open state and the closed state of the blade group when the cam follower slides, and a blade driving section configured to move the blade group from the one of the open state and the closed state to the other of the open state and the closed state when the cam follower slides. Where the cam follower slides in the blade maintaining section and the blade driving section in this order, the motor is driven in the micro step driving mode when the cam follower slides in the blade maintaining section, and the motor is driven in the full step driving mode when the cam follower slides in the blade driving section.

Further features of the present invention will become apparent from the following description of exemplary embodiments with reference to the attached drawings.

DESCRIPTION OF THE EMBODIMENTS

Figure 1:
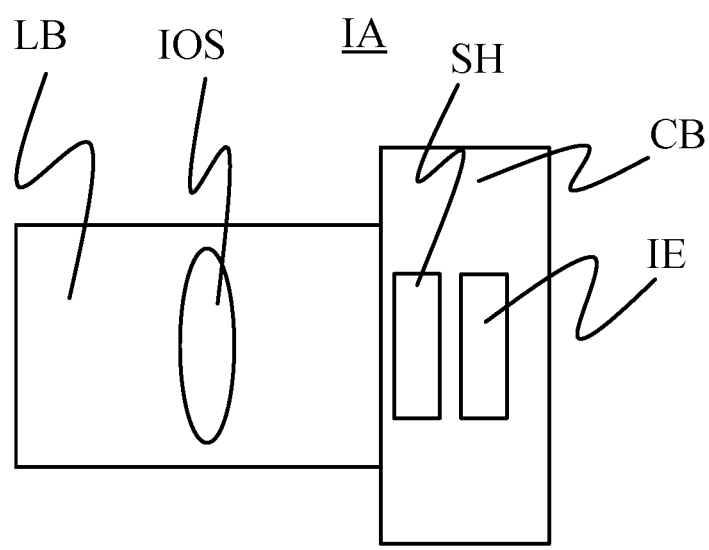
FIG. 1 is a schematic view of an image pickup apparatus that includes a shutter apparatus according to embodiments of the present invention.

Referring now to the accompanying drawings, a description will be given of embodiments of the present invention. The same elements in each figure will be designated by corresponding reference numerals, and a description thereof will be omitted.

First Embodiment

FIG. 1 is a schematic diagram of an image pickup apparatus IA that has a shutter apparatus SH according to an embodiment of the present invention. The image pickup apparatus IA includes a lens barrel LB configured to hold an image pickup optical system IOS, and a camera body CB configured to hold the shutter apparatus SH and an image pickup element or image sensor IE. The lens barrel LB may be attached to and detached from the camera body CB.

Figure 2:
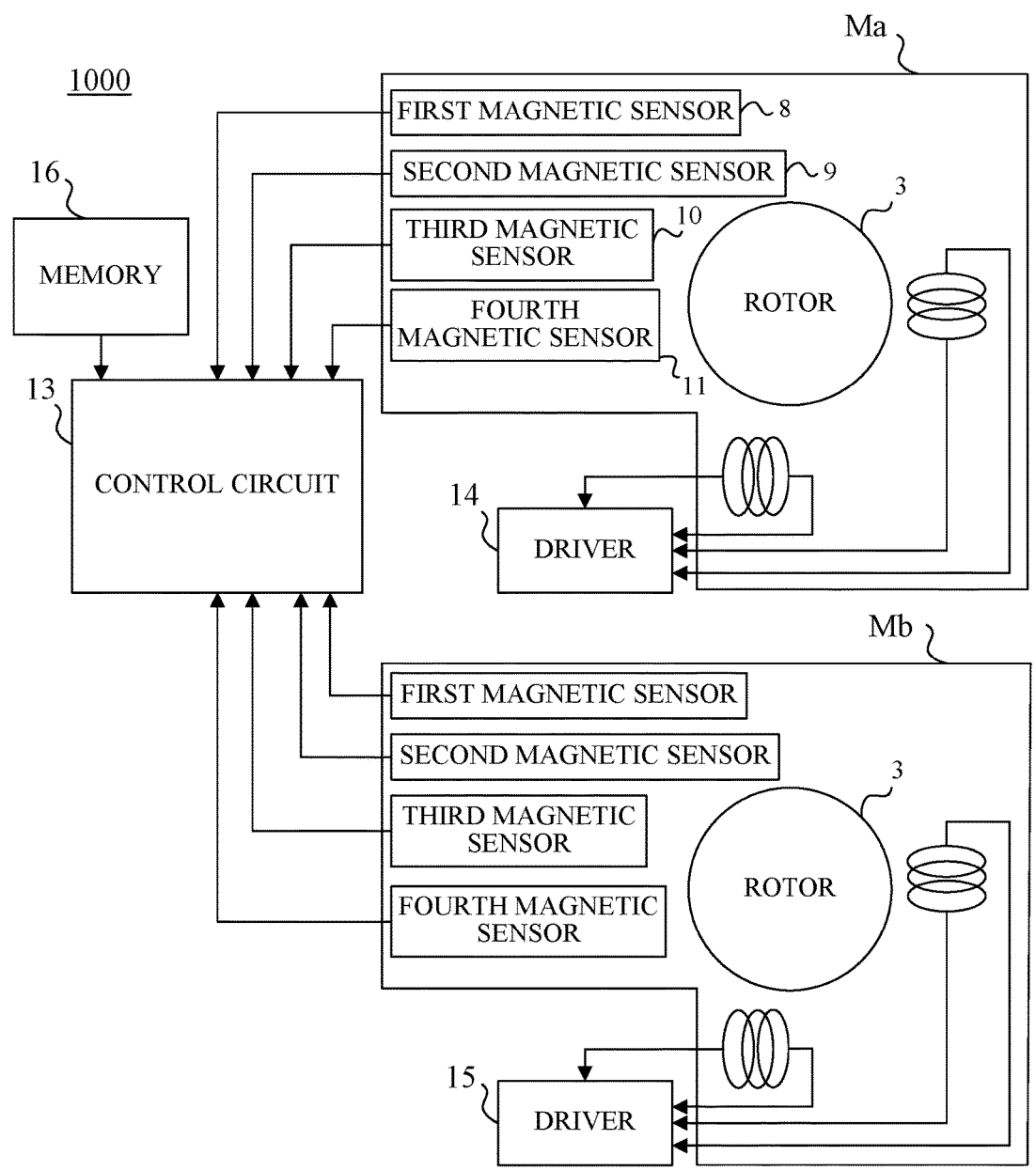
FIG. 2 is a block diagram of an electric circuit for a drive controller according a first embodiment.

A detailed description will now be given of a drive controller 1000 for the shutter apparatus SH. FIG. 2 is a block diagram of the drive controller 1000. The drive controller 1000 includes motors Ma and Mb having the same structures, a control circuit (controller) 13, a motor driver (driver) 14 configured to electrify a coil in the motor Ma, a motor driver (driver) 15 configured to electrify a coil in the motor Mb, and a memory 16.

Figure 3:
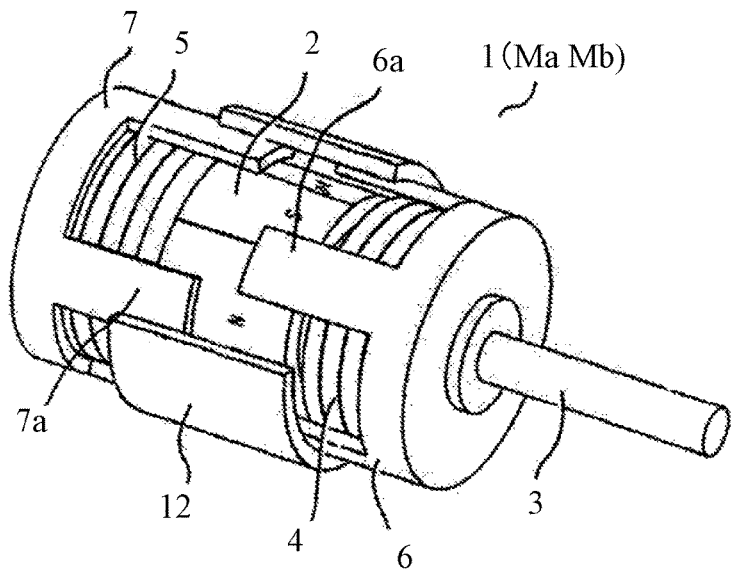
FIG. 3 is a perspective overview of a motor according to the first embodiment.

FIG. 3 is a perspective overview of the motor (Ma, Mb). For description purposes, FIG. 3 illustrates and severs part of a component.

A rotor 3 has a magnet 2 and is rotatably controlled by the control circuit 13. The magnet 2 has a cylindrical shape, and the outer circumference surface is divided in the circumferential direction and alternately multi-magnetized in different poles. This embodiment divides the surface into eight sections or eight magnetic poles, but the number of poles is not limited to eight poles and may be four or twelve poles.

A first coil 4 is provided to a first end of the magnet 2 in an axial direction. A first yoke 6 is made of a soft magnetic material, and opposite to the outer circumference surface of the magnet 2 via an aperture. The first yoke 6 extends in the axial direction from an annular body, and includes a plurality of first magnetic poles 6a arranged at regular intervals in the circumferential direction. The first magnetic pole 6a is excited when the first coil 4 is electrified. A first stator unit includes the first coil 4, the first yoke 6, and the magnet 2 opposite to the plurality of first magnetic poles 6a.

A second coil 5 is provided to a second end of the magnet 2 in an axial direction (opposite to the first end in the axial direction to which the first coil 4 is attached). A second yoke 7 is made of a soft magnetic material, and opposite to the outer circumference surface of the magnet 2 via an aperture. The second yoke 7 extends in the axial direction from the annular body, and includes a plurality of second magnetic poles 7a arranged at regular intervals in the circumferential direction. The second magnetic pole 7a is excited when the second coil 5 is electrified. A second stator unit includes the second coil 5, the second yoke 7, and the magnet 2 opposite to the plurality of second magnetic poles 7a.

A torque applied to the rotor 3 can be changed by switching (N and S) poles magnetized in the first magnetic pole 6a and the second magnetic pole 7a.

A forward rotation is a clockwise rotation of the rotor 3 viewed from the output shaft, and a backward rotation is a counterclockwise rotation of the rotor 3 viewed from the output shaft.

Figure 4:
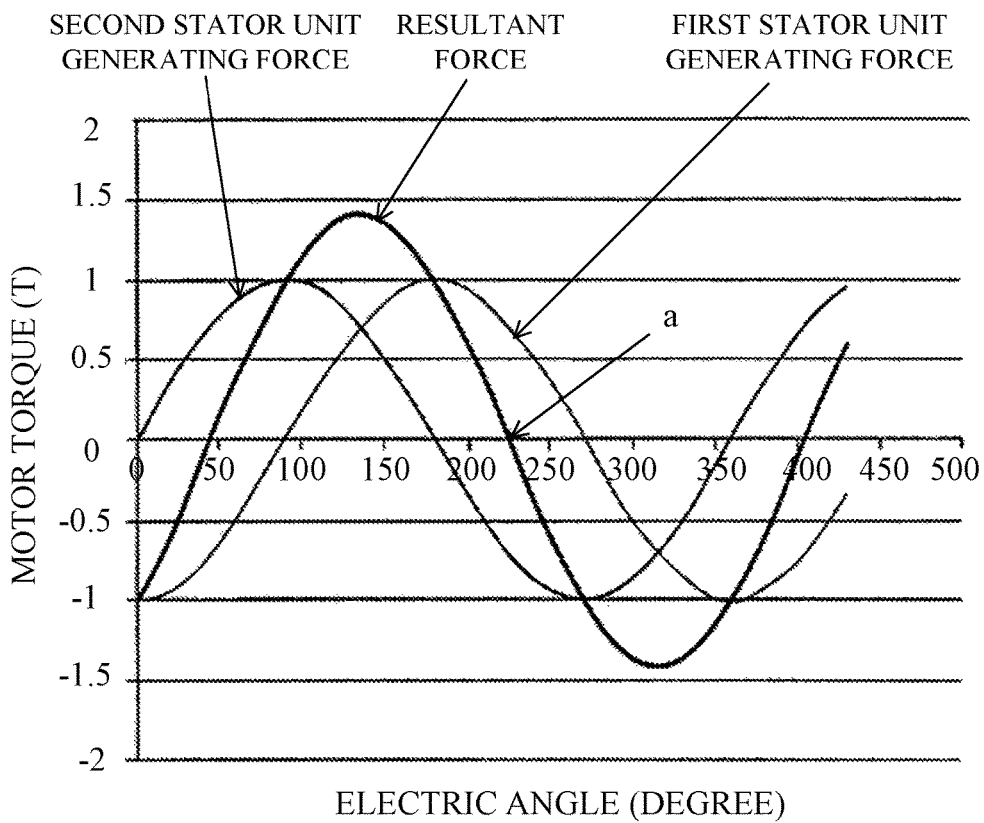
FIG. 4 illustrates a relationship between an electric angle of a rotor and a motor torque when a constant current is applied to a coil in the motor according to the first embodiment.

FIG. 4 illustrates a relationship between the electric angle of the rotor 3 and the torque of the motor 1 (Ma, Mb) when the constant current is applied to the first coil 4 and the second coil 5. An abscissa axis is an electric angle, and an ordinate axis is a motor torque. The motor torque has a positive torque that forwardly rotates the rotor 3.

Figure 5A:
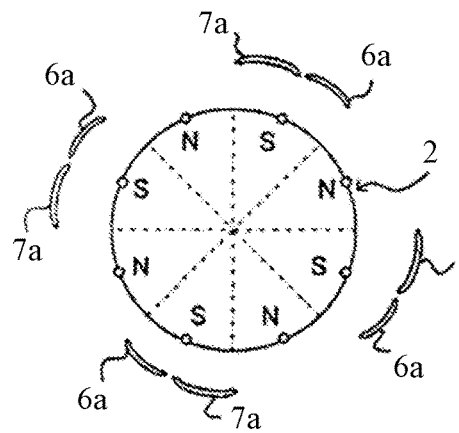
FIGS. 5A and 5B are sectional views orthogonal to an axis of the motor illustrating a phase relationship between a yoke and a magnet according to the first embodiment.
Figure 5B:
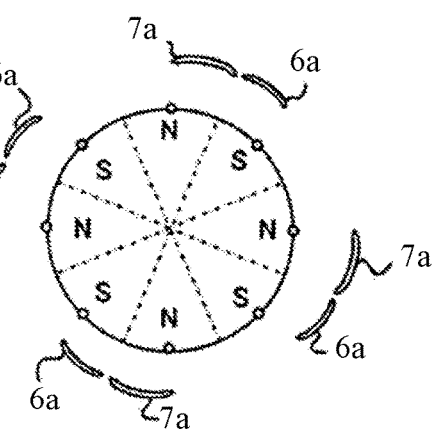

FIGS. 5A and 5B are sectional views orthogonal to the axis of the motor Ma (Mb) illustrating phase relationships between each yoke and the magnet 2. When the current flows in the first coil 4 in the forward direction, the first magnetic pole 6a is magnetized into the N poles. When the current follows in the second coil 5 in the forward direction, the second magnetic pole 7a is magnetized into the N poles.

FIG. 5A illustrates a distance between the center of the magnetized pole of the magnet 2 and the first magnetic pole 6a is equal to a distance between the polar center and the second magnetic pole 7a. The phase in the state of FIG. 5A corresponds to a symbol "a" in FIG. 4. In the state in FIG. 5A, the rotating phase holding force occurs, but the magnet 2 is balanced because its S pole is attracted by the first magnetic pole 6a and the second magnetic pole 7a, and no rotating force occurs. When the pole magnetized by the second magnetic pole 7a is switched to the S pole from the state in FIG. 5A, the rotor 3 rotates to the state in FIG. 5B.

In the state in FIG. 5B, similar to the state in FIG. 5A, the rotation phase holding force occurs but no rotating force occurs. In other words, the magnet 2 is balanced because the S pole and the N pole are attracted by the first magnetic pole 6a and the second magnetic pole 7a, respectively.

A memory 16 stores a driving frequency combination used to electrify each phase in the first and second coils 4 and 5 in the motor 1 (Ma, Mb). Thus, the rotor 3 can be rotated by switching the electrifying directions of the first and second coils 4 and 5 in accordance with the driving frequency, and by switching the polarities of the first magnetic pole 6a and the second magnetic pole 7a.

Figure 6A:
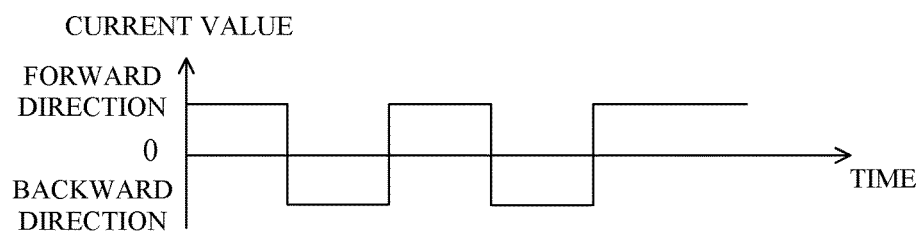
FIGS. 6A and 6B illustrate a relationship between an electrified current in the coil and the elapsed time in full step driving according to the first embodiment.
Figure 6B:
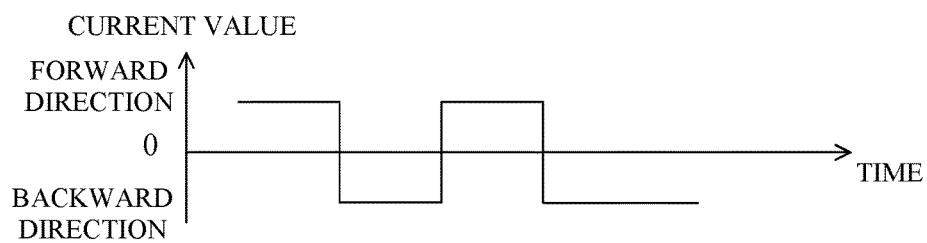

Thus, driving in the full step driving mode (full step driving) can be performed by switching electrifying the first and second coils 4 and 5 with a constant electrification amount. FIGS. 6A and 6B illustrate a relationship between the electrified current in the first and second coils 4 and 5 and the elapsed time in the full step driving. Each of FIGS. 6A and 6B illustrates the electrifications in the first and second coils 4 and 5.

Micro step driving can be provided which changes a ratio of the current value electrified in the first and second coils 4 and 5, and stops the rotor or the magnet 2 between the phases illustrated in FIGS. 5A and 5B.

Figure 7:
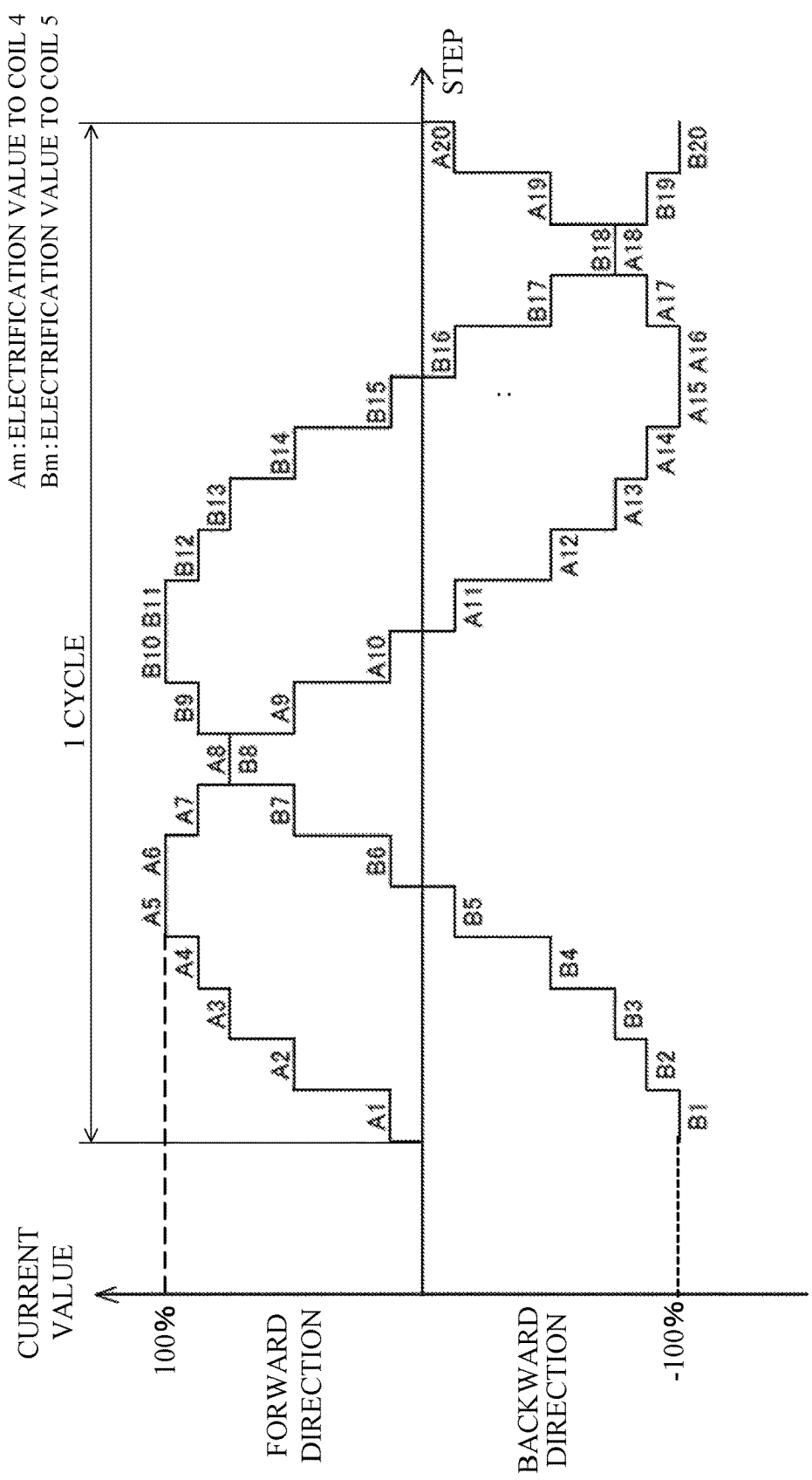
FIG. 7 illustrates a relationship between the number of steps and the electrified current in the coil in micro step driving according to the first embodiment.

A description will now be given of driving in the micro step driving mode (micro step driving). FIG. 7 illustrates the relationship between the electrified current in the first and second coils 4 and 5 and the number of steps in the micro step driving.

The memory 16 stores a micro step driving table as a driving frequency table for the micro step driving that indicates rations (A1, B1), (A2, B2), (A3, B3), . . . (Am, Bm) of the current values electrified in the first and second coils 4 and 5. A1, A2, A3, . . . , and Am are ratios of the current value electrified in the first coil 4. B1, B2, B3, . . . , and Bm are ratios of the current value electrified in the second coil 5. The current value changing method may use a pulse width modulation (PDM) control method of the applied voltage, and this electrifying method stores data of the electrification duty value as the value stored in the micro step driving table.

Since the micro step driving reduces the current values electrified in the first and second coils 4 and 5, the driving force is smaller than that in the full step driving. However, since the micro step driving has a rotating resolution in the motor output shaft higher than that in the full step driving, the controllability of the target improves.

For these reasons, in accurately driving the target, the micro step driving may be used up to a desired speed and the full step driving and a high driving method may be used for a predetermined speed or higher.

Figure 8:
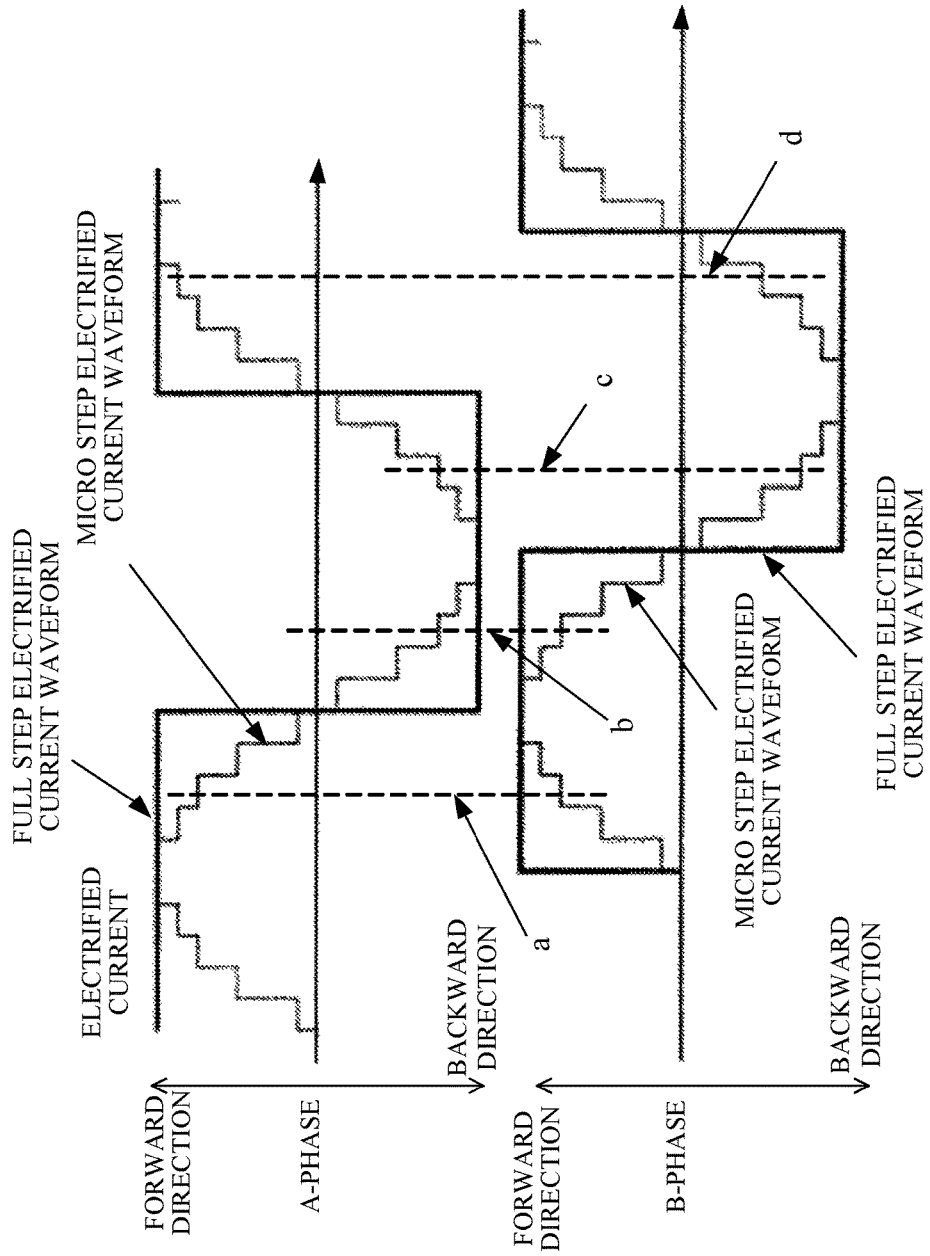
FIG. 8 illustrates a relationship between the number of steps and the electrified current in the coil in the full step driving and the micro step driving according to the first embodiment.
Figure 9:
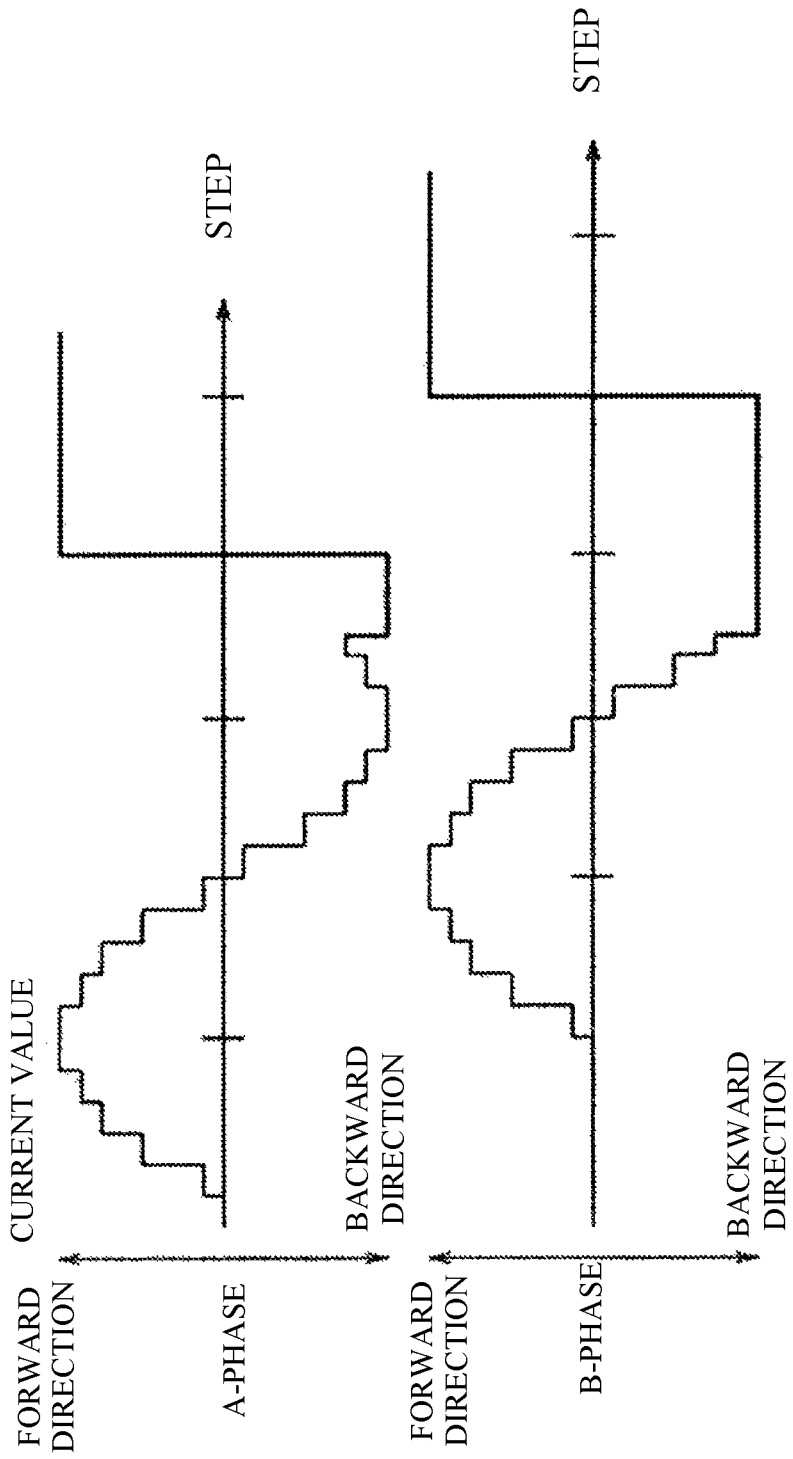
FIG. 9 illustrates an illustrative relationship between the number of steps and the electrified current in the coil when the full step driving is switched to the micro step driving according to the first embodiment.

Next follows a description of switching between the full step driving and the micro step driving. FIG. 8 illustrates a relationship between the number of steps and the electrified current in the first and second coils 4 and 5 and the electrified current in the full step driving and the micro step driving. The micro step driving is switched to the full step driving or the full step driving is switched to the micro step driving at timings "a" to "d" in which each phase has the same absolute value of the electrified current in the micro step driving. For example, when the micro step driving is switched to the full step driving at the timing "c," the relationship between the number of steps and the electrified current in the first and second coils changes as illustrated in FIG. 9. Each phase may not have exactly the same absolute values of the electrified current in switching and may have substantially or approximately the same absolute values. When the electrified current changes stepwise, the micro step driving table may not have a combination of the equal absolute values of the current value in each phase. In this case, driving may be switched when each phase has approximately equal absolute values of the electrified current.

The driving may be switched when the ratios of the electrified currents in the two coils are exactly or substantially one to one, the ratio is exactly or substantially the same in the full step driving and the micro step driving, and therefore the rotor rotating position does not change when the driving mode is switched. Thereby, when the micro step driving is switched to the full step driving or the full step driving is switched to the micro step driving, a smooth rotational transfer is available and the vibrations and step-out in switching can be restrained.

Figure 10:
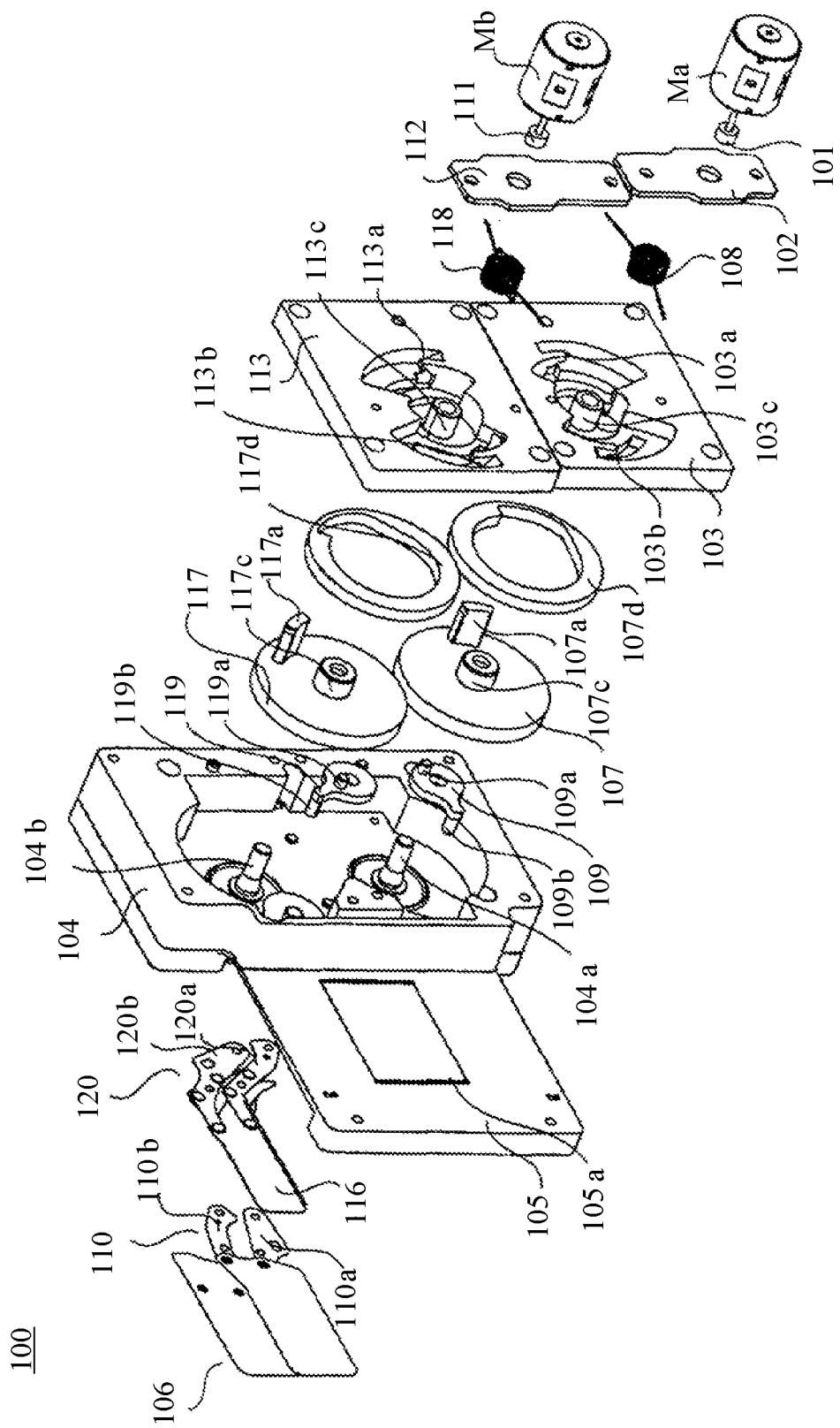
FIG. 10 is an exploded perspective view of a focal plane shutter according to the first embodiment.

Next follows a description of a structure of a focal plane shutter 100 according to this embodiment. FIG. 10 is an exploded perspective view of the focal plane shutter 100. The focal plane shutter 100 includes a first shutter unit and a second shutter unit.

The first shutter unit includes a motor Ma, a first pinion gear 101, a first attachment plate 102, a first cover 103, a first blade unit, a first cam gear 107, a first spring 108, a first driving lever 109, a cam base 104, and a shutter base plate 105.

The first pinion gear 101 is fixed onto an output shaft of the motor Ma. The first attachment plate 102 mounted with the motor Ma is fixed onto the cam base 104. The first cover 103 fixes the motor Ma via the first attachment plate 102. The cam base 104 is fixed onto the shutter base plate 105. The shutter base plate 105 has an opening 105a for exposure.

The first blade unit includes a first blade group (or first blades) 106 and a first blade arm 110. The first blade group 106 includes first blades 106a and 106b, and is coupled with the first blade arm 110. The first blade group 106 can move between a light shield state (closed state) in which the first blade group 106 covers the opening 105a in the shutter base plate 105 and prevents the object light from reaching the image pickup element IE as the first blade arm 110 rotates and an opening state in which the first blade group 106 retreats from the opening 105a and guides the object light to the image pickup element IE.

Figure 11:
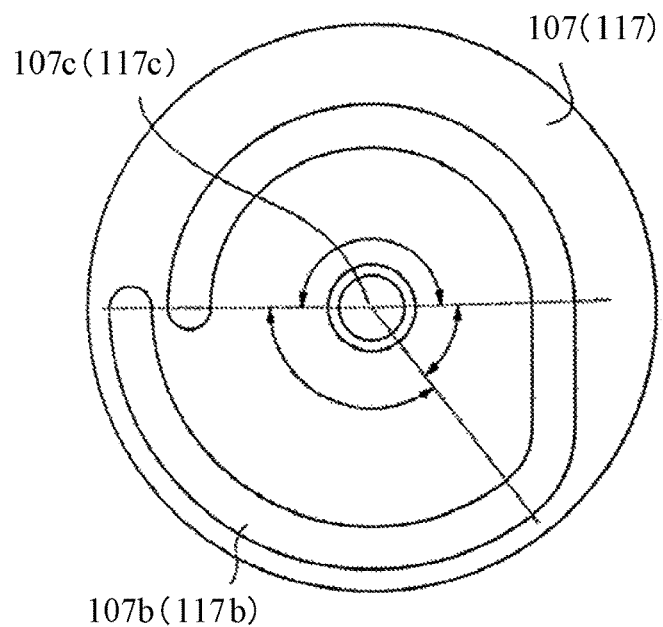
FIG. 11 illustrates cam areas in a cam gear according to the first embodiment.

The first cam gear 107 is connected to the output shaft of the motor Ma. The first cam gear 107 has a projection 107a engageable with an arm 108a and an arm 108b in a first spring (urging member) 108, which will be described later, and forms a cam groove 107b slidably engaged with a cam follower 109a in the first driving lever 109. The cam groove 107b includes, as illustrated in FIG. 11, a first cam area A (blade maintaining section, runup section), a second cam area B (blade driving section), and a third cam area C (blade maintaining section, decelerating section). In this embodiment, a state in which the cam follower 109a slides in the first cam area A will be referred to as a runup period. A state in which the cam follower 109a slides in the second cam area B will be referred to as a blade driving state. A state in which the cam follower 109a slides in the third cam area C will be referred to as a decelerating state. The first cam area A and the third cam area C are formed concentric to the rotation center of the first cam gear 107. The first cam gear 107 has a hole 107c engaged with a shaft 104a of the cam base 104. The first cam gear 107 is integrated with a weight 107d, and the inertia mass is larger than the first blade group 106 and the first driving lever 109.

The first spring 108 has an inner diameter part guided by a cylinder part 103c in the first cover 103, and is charged so that the arm 108a generates a counterclockwise force and the arm 108b generates a clockwise force. The arm 108a is restricted from moving in the counterclockwise direction by an engagement unit 103a in the first cover 103. The arm 108b is restricted from moving in the clockwise direction by an engagement unit 103b in the first cover 103.

The first driving lever (driving member) 109 is rotatably attached to the cam base 104, and rotates as the first cam gear 107 rotates via a cam follower 109a engaged with the cam groove 107b.

The first blade arm 110 includes a main arm 110a and a sub arm 110b, and is attached to the shutter base plate 105 so as to rotate through a driving pin 109b in the first driving lever 109.

The second shutter unit includes a motor Mb, a second pinion gear 111, a second attachment plate 112, a second cover 113, a second blade unit, a second cam gear 117, a second spring 118, a second driving lever 119, a cam base 104, and a shutter base plate 105.

The second pinion gear 111 is fixed onto an output shaft of the motor Mb. The second attachment plate 112 mounted with the motor Mb is fixed onto the cam base 104. The second cam cover 113 fixes the motor Mb via the second attachment plate 112.

The second blade unit includes second blade group (or second blades) 116 and a second blade arm 120. The second blade group 116 includes second blades 116a, 116b, and 116c, and is coupled with the second blade arm 120. The second blade group 116 can move between a light shield state (closed state) in which the second blade group 116 covers the opening 105a in the shutter base plate 105 as the second blade arm 120 rotates and prevents the object light from reaching the image pickup element IE, and an opening state in which the second blade group 116 retreats from the opening 105a and guides the object light to the image pickup element IE.

The second cam gear 117 is connected to the output shaft of the motor Mb. The second cam gear 117 has a projection 117a engageable with an arm 118a and an arm 118b in the second spring (urging member) 118, which will be described later, and forms a cam groove 117b slidably engageable with a cam follower 119a in the second driving lever 119. The cam groove 117b includes, as illustrated in FIG. 11, a first cam area A (blade maintaining section, runup section), a second cam area B (blade driving section), and a third cam area C (blade maintaining section, decelerating section). In this embodiment, a state in which the cam follower 119a slides in the second cam area A will be referred to as a runup period. A state in which the cam follower 119a slides in the second cam area B will be referred to as a blade driving state. A state in which the cam follower 119a slides in the third cam area C will be referred to as a decelerating state. The first cam area A and the third cam area C are formed concentric to the rotation center of the second cam gear 117. The second cam gear 117 has a hole 117c engaged with the shaft 104a of the cam base 104. The second cam gear 117 is integrated with a weight 117d, and the inertia mass is larger than the second blade group 116 and the second driving lever 119.

The second spring 118 has an inner diameter part guided by a cylinder 113c in the second cover 113, and is charged so that the arm 118a generates a counterclockwise force and the arm 118b generates a clockwise force. The arm 118a is restricted from moving in the counterclockwise direction by an engagement unit 113a in the second cover 113. The arm 118b is restricted from moving in the clockwise direction by an engagement unit 113b in the second cover 113.

The second driving lever (driving member) 119 is rotatably attached to the cam base 104, and rotates as the second cam gear 117 rotates via a cam follower 109a engaged with the cam groove 117b.

The second blade arm 120 includes a main arm 110a and a sub arm 120b, and is attached to the shutter base plate 105 so as to rotate through a driving pin 119b in the second driving lever 119.

Referring now to FIGS. 12 to 18, a description will be given of an operation of the first shutter unit.

Figure 12:
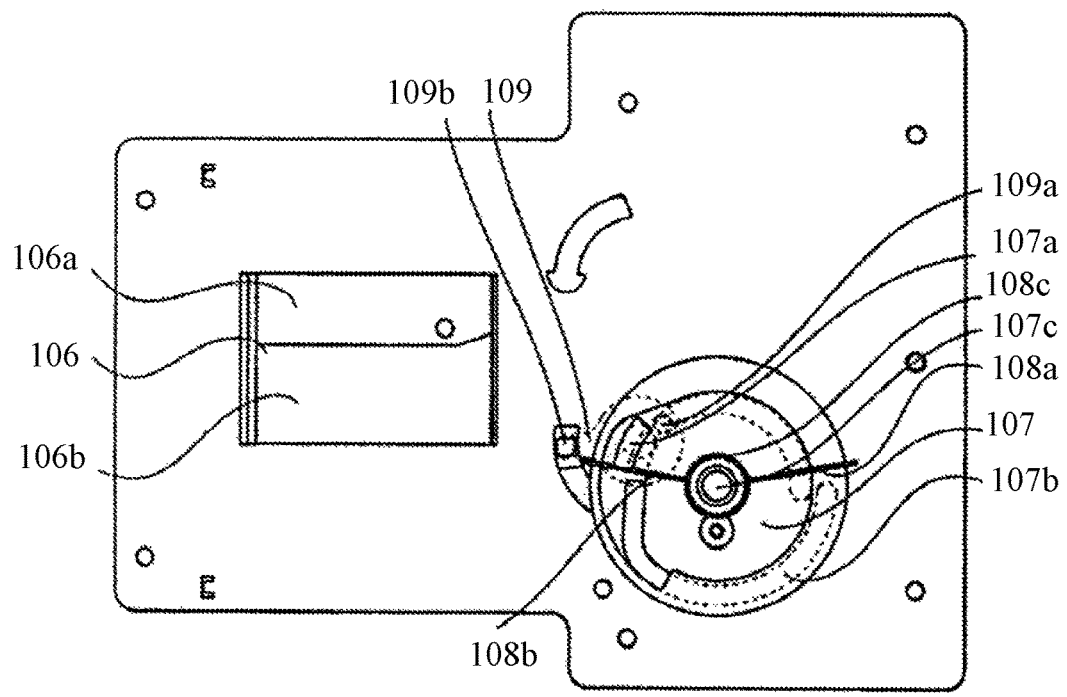
FIG. 12 illustrates a standby state of a first shutter unit according to the first embodiment.

FIG. 12 illustrates a standby state (initial state) of the first shutter unit. In this state, the cam follower 109a in the first driving lever 109 is engaged with the first cam area A in the cam groove 107b in the first cam gear 107, and the first blade group 106 is held in the light shield state. The projection 107a in the first cam gear 107 is not forced in the clockwise direction by the arm 108b in the first spring 108.

In the state in FIG. 12, when the control circuit 13 forwardly rotates the motor Ma, the first gear 107 rotates counterclockwise. In this case, the projection 107a contacts the arm 108b and charges the first spring 108. Thus, the control circuit 13 needs to rotate the motor Ma against the force of the first spring 108, and thus drives the motor Ma in the full step driving having a large driving force. While the first cam gear 107 rotates counterclockwise, the cam follower 109a slides in the first cam area A. However, since the first cam area A is concentrically formed to the rotating center of the first cam gear 107, the first driving lever 109 does not rotate and the first blade group 106 is maintained in the light shield state. The projection 107a contacts a stopper (not illustrated), and the first shutter unit becomes as illustrated in FIG. 13.

Figure 13:
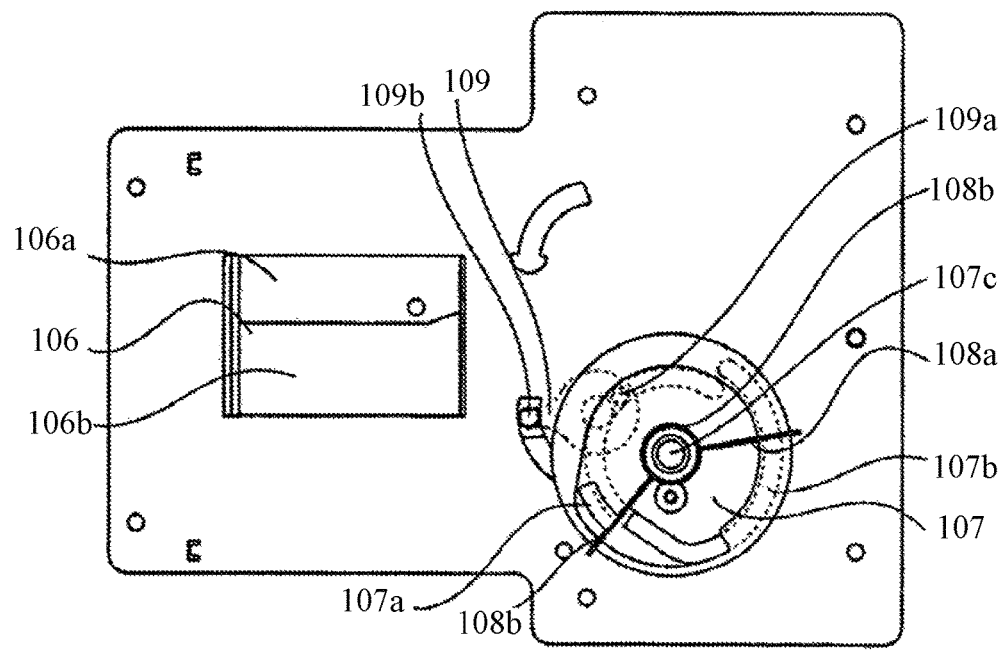
FIG. 13 illustrates a spring charge completion state of the first shutter unit according to the first embodiment.
Figure 14:
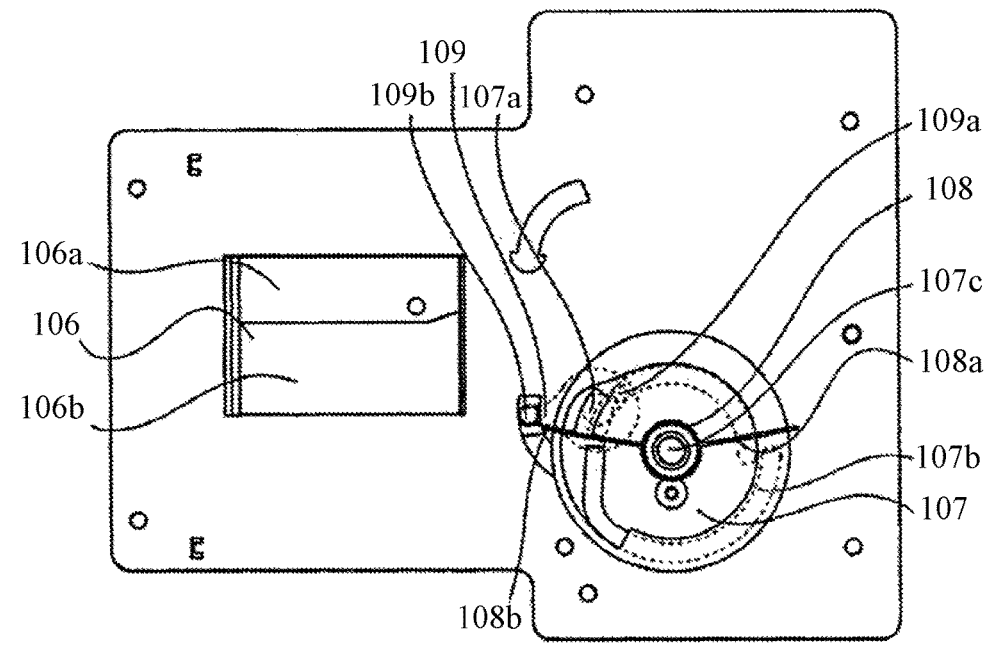
FIG. 14 illustrates a spring acceleration completion state of the first shutter unit according to the first embodiment.
Figure 15:
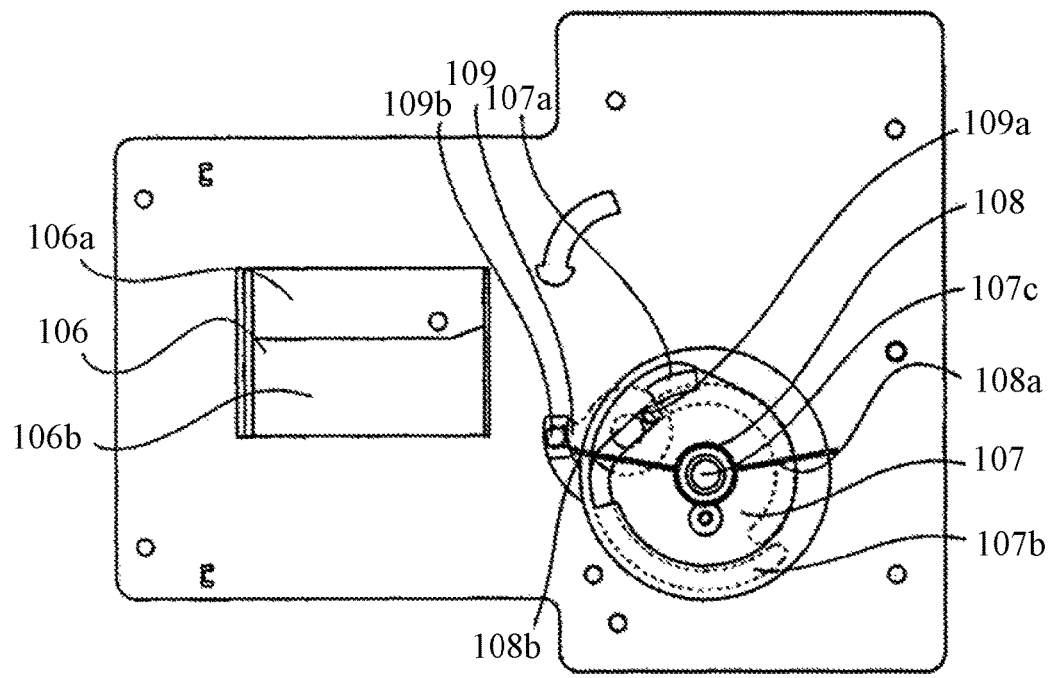
FIG. 15 illustrates a blade driving ready state of the first shutter unit according to the first embodiment.

FIG. 13 illustrates a spring charge completion state of the first shutter unit. In the state in FIG. 13, the control circuit 13 reversely rotates the motor Ma in the micro step driving in response to the release signal. As the motor Ma rotates, the first cam gear 107 rotates clockwise, and the first shutter unit becomes as illustrated in FIG. 15 through the state in FIG. 14. FIG. 14 illustrates a spring acceleration completion state of the first shutter unit. FIG. 15 illustrates a blade driving ready state of the first shutter unit. In this embodiment, the shutter unit is a runup state from the state in FIG. 13 to the state in FIG. 15. In this embodiment, in the cam area A in the cam groove 107b, a section (in which the first shutter unit is turned from the state in FIG. 13 to the state in FIG. 14) in which the first cam gear 107 is accelerated by the force by the first spring 108 will be referred to as an acceleration section. In the cam area A in the cam groove 107b, a section (in which the first shutter unit is turned from the state in FIG. 14 to the state in FIG. 15) in which the first cam gear 107 is not accelerated by the force by the first spring 108 will be referred to as a non-urging section.

When a positional shift is small between the electric signal and the first shutter unit in the runup state, the first shutter unit is positionally controlled by the motor Ma. Once the position of the first shutter unit is controlled, an exposure amount to the image pickup element IE can be controlled and thus the shutter accuracy can be improved. Hence, it is important to minimize the positional shift between the electric signal and the first shutter unit in the runup state. The controllability of the positional shift between the electric signal and the first shutter unit changes depending on a one-step pitch, and the positional shift becomes smaller as the pitch reduces. Hence, in the runup state, driving the motor Ma in the micro step driving in the runup section is very effective in improving the accuracy.

In the runup state, the first cam gear 107 rotates clockwise. However, the cam follower 109a slides in the first cam area A, thus the first driving lever 109 does not rotate, and the first blade group 106 is maintained in the light shield state. Thus, a load applied to the motor Ma becomes very small in the runup state. The motor Ma can be driven without step-out in the micro step driving having a driving force smaller than that in the full state driving.

From the state in FIG. 13 to the state in FIG. 14, the first cam gear 107 is gradually accelerated by a predetermined driving frequency of the motor Ma and the force of the first spring 108, and an error reduced at a predetermined rotating speed. In addition, since the force of the first spring 108 is added to the driving force of the motor Ma, the first cam gear 107 having a large mass can be easily rotated at a high speed. In the state in FIG. 14, the first cam gear 107 is arranged at the same position as that illustrated in FIG. 12, and rotated clockwise at a predetermined speed. In the runup section, the motor Ma is driven in the micro step driving and rotated in synchronization with the coil electrification switching frequency. Hence, the number of rotations reaches the desired number of rotations in the state illustrated in FIG. 15.

When the control circuit 13 reversely rotates the motor Ma in the state in FIG. 15, the first cam gear 107 clockwise rotates and the cam follower 109a slides in the second cam area B in the cam groove 107b. In other words, the first shutter unit becomes a blade driving state. Hence, as the first cam gear 107 rotates, the cam follower 109a slides in the second cam area B, and the first driving lever 109 rotates counterclockwise. As the first driving lever 109 rotates, the first blade arm 110 is driven and the first blade group 106 turns from the light shielding state to the opening state.

Since the motor Ma is driven in the micro step driving in the state in FIG. 15, the speed of the first cam gear 107 is controlled to the desired rotating speed and the first cam gear 107 is rotated at a high speed. Where the first driving lever 109 is rotated counterclockwise, a large load is applied to the motor Ma via the first cam gear 107. It is therefore necessary to increase a driving force of the motor Ma. The first cam gear 107 is integrated with a weight 107d, and has a sufficient inertia mass. The motor Ma can be stably driven without control as accurate as the micro step driving by converting a rotating momentum of the first cam gear 107 into driving momenta for the first blade unit and the first driving lever 109.

The driving accuracy and speed of the first blade unit and the first driving lever 109 affect the rotational state of the first cam gear 107, such as a synchronization between a speed and an electric signal, when the first driving lever 109 starts rotating. However, after the first driving lever 109 rotates, the rotating force of the motor Ma is less affected.

Therefore, the control circuit 13 drives the motor Ma in the full step driving from the state illustrated in FIG. 15. The micro step driving is switched to the full step driving at the timings "a," "b," "c," and "d" in FIG. 7 before the first shutter unit has the blade driving state or when the first shutter unit has the runup state.

Figure 16:
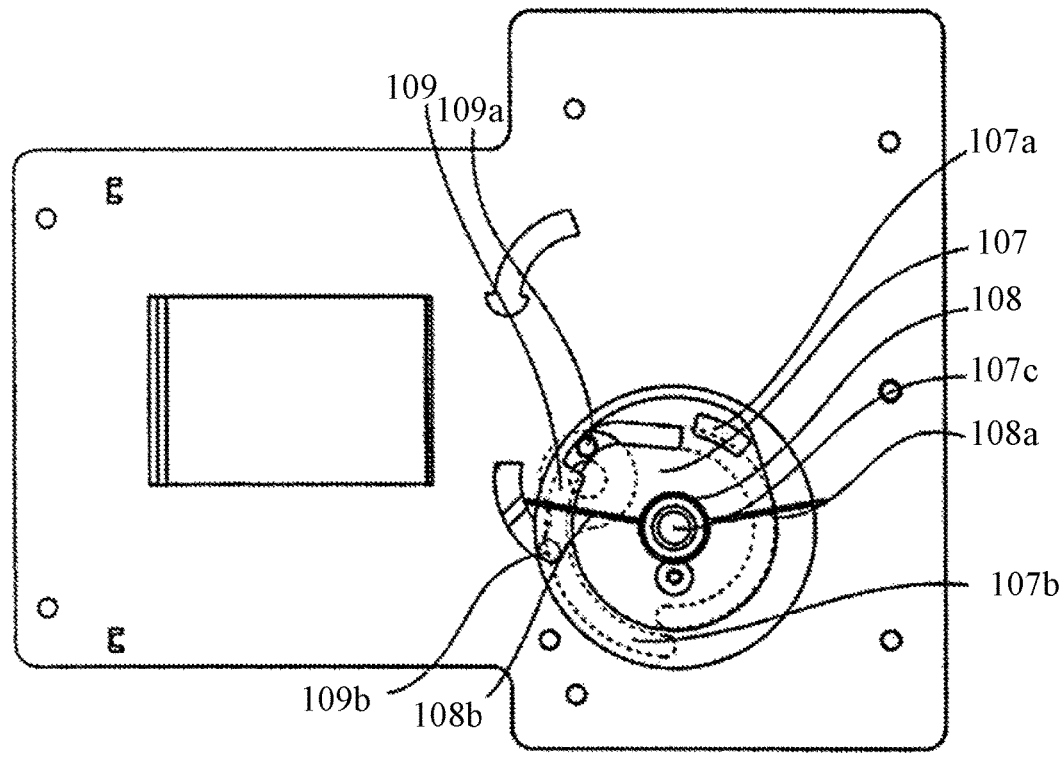
FIG. 16 illustrates a blade running completion state of the first shutter unit according to the first embodiment.

FIG. 16 illustrates the opening state of the first blade group 106 or the blade running completion state of the first shutter unit. In this state, the cam follower 109a is engaged with the third cam area C in the cam groove 107b, and the first blade group 106 is held in the opening state. In other words, the first shutter unit is in the decelerating state. In this embodiment, the decelerating state continues from FIG. 16 to FIG. 18.

It is unnecessary to accurately drive the first blade unit in the decelerating state, and a large driving force is necessary for the deceleration and the full step driving is effective. In the decelerating state, the cam follower 109a slides in the third cam area C that is formed concentrically to the rotating center of the first cam gear 107. Thus, even when the first cam gear 107 rotates, the first driving lever 109 does not rotate and the first blade group 106 is held in the opening state.

Figure 17:
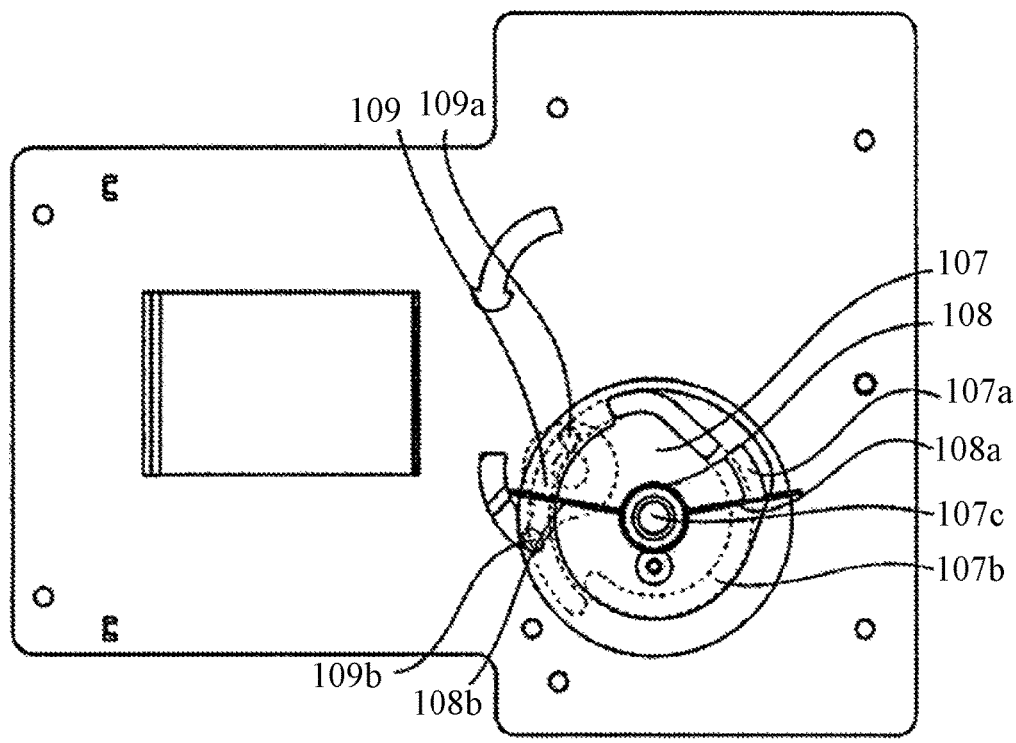
FIG. 17 illustrates a spring charge starting state in a decelerating state in the first shutter unit according to the first embodiment.

In the state in FIG. 16, the control circuit 13 reversely rotates the motor Ma in the full step driving, the first cam gear 107 rotates clockwise and the first shutter unit has the state in FIG. 17. FIG. 17 illustrates a spring charge starting state in the decelerating state of the first shutter unit. In the state in FIG. 17, the projection 107a contacts the arm 108a in the first spring 108.

Figure 18:
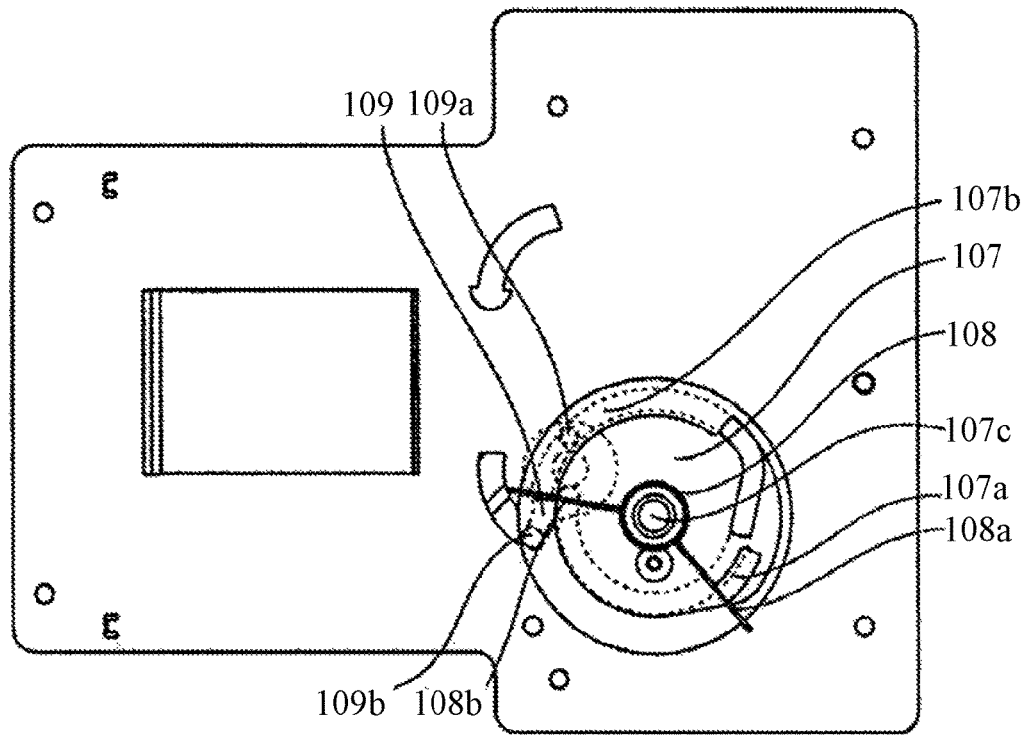
FIG. 18 illustrates a spring charge completion state in the deceleration state in the first shutter unit according to the first embodiment.

When the control circuit 13 reversely rotates the motor Ma in the full step driving in the state in FIG. 17, the first cam gear 107 rotates clockwise. At this time, the projection 107a charges the first spring 108. The projection 107a contacts a stopper (not illustrated), and the first shutter unit has the state illustrated in FIG. 18. FIG. 18 illustrates a spring charge completion state in the decelerating state in the first shutter unit.

Referring now to FIGS. 19 to 25, a description will be given of the operation of the second shutter unit.

Figure 19:
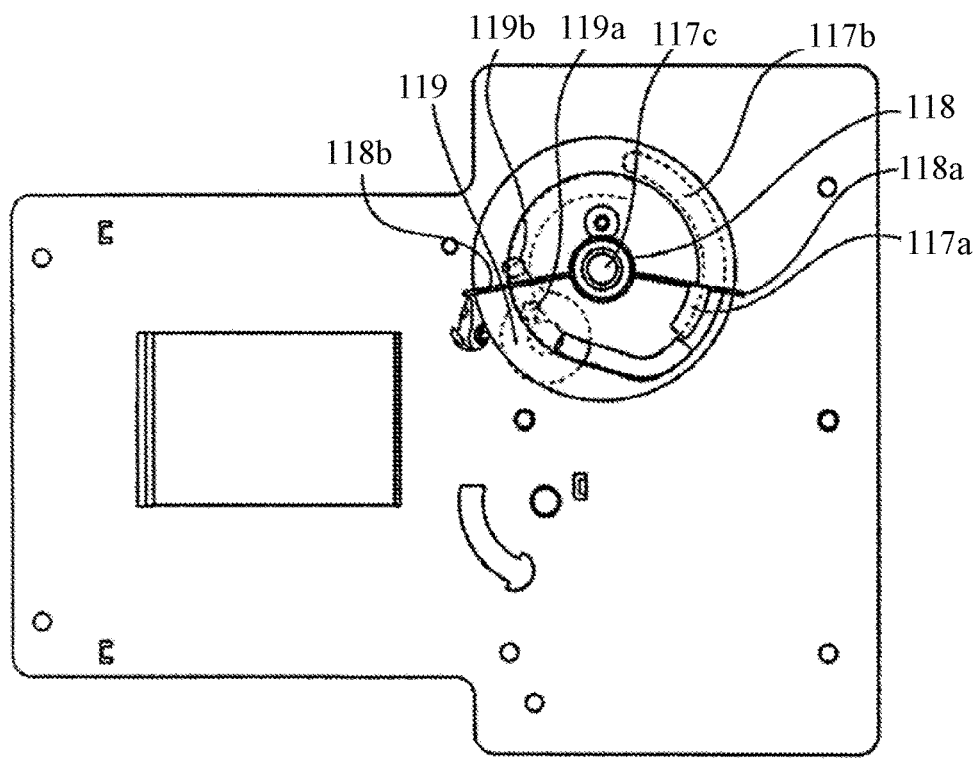
FIG. 19 illustrates a standby state of a second shutter unit according to the first embodiment.

FIG. 19 illustrates a standby state (initial state) of the second shutter unit. In this state, the cam follower 119a in the second driving lever 119 is engaged with the first cam area A in the cam groove 117b in the second cam gear 117, and the second blade group 116 is held in the opening state. The projection 117a in the second cam gear 117 is not clockwise forced by the arm 118a in the second spring 118.

In the state in FIG. 19, when the control circuit 13 forwardly rotates the motor Mb, the second cam gear 117 rotates counterclockwise. At this time, the projection 117a contacts the arm 118b and charges the second spring 118. Thus, the control circuit 13 needs to rotate the motor Mb against the force of the second spring 118, and thus drives the motor Mb in the full step driving having a large driving force. When the second cam gear 117 rotates counterclockwise, the cam follower 119a slides in the first cam area A. However, since the first cam area A is concentrically formed to the rotating center of the second cam gear 117, the second driving lever 119 does not rotate and the second blade group 116 is held in the opening state. The projection 117a contacts a stopper (not illustrated), and the second shutter unit has the state illustrated in FIG. 20.

Figure 20:
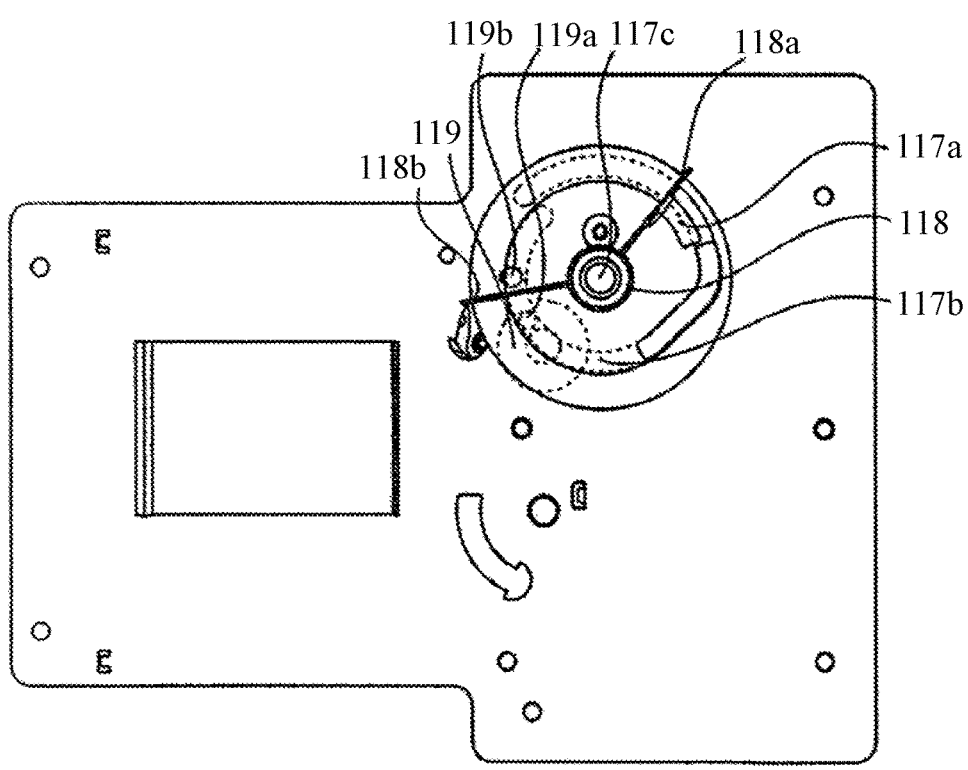
FIG. 20 illustrates a spring charge completion state of the second shutter unit according to the first embodiment.
Figure 21:
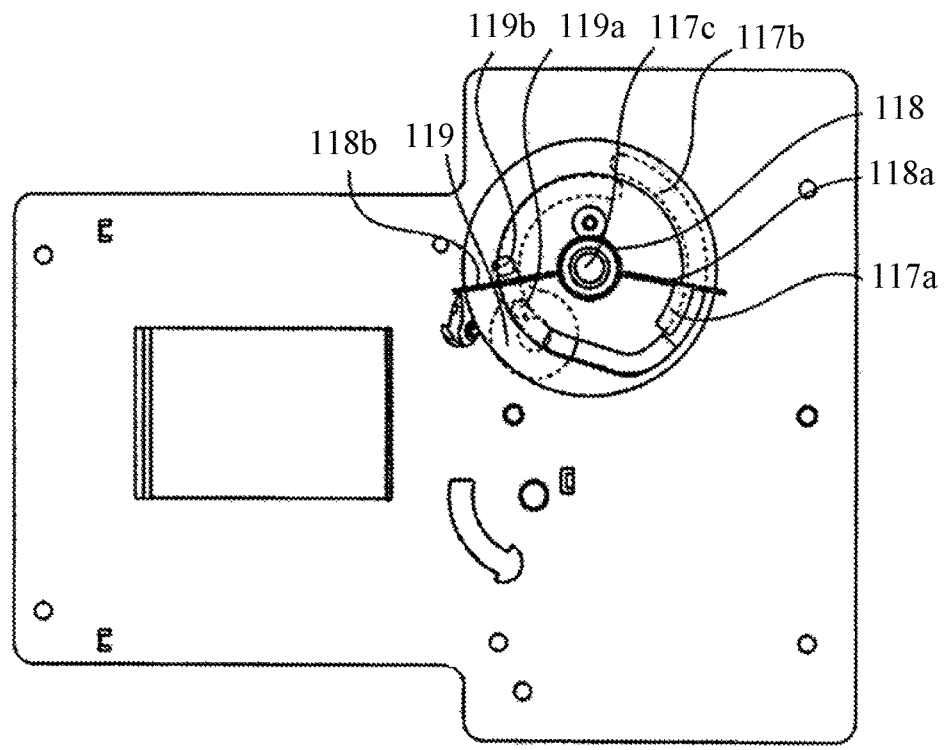
FIG. 21 illustrates a spring acceleration completion state of the second shutter unit according to the first embodiment.
Figure 22:
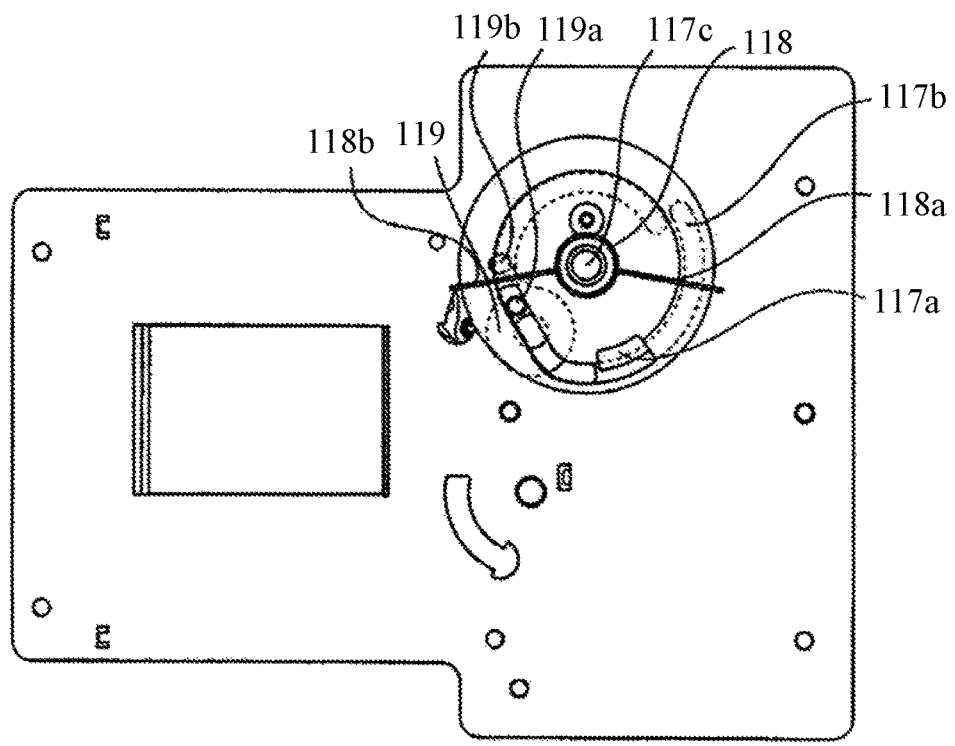
FIG. 22 illustrates a blade driving ready state of the second shutter unit according to the first embodiment.

FIG. 20 illustrates a spring charge completion state of the second shutter unit. In the state in FIG. 20, the control circuit 13 reversely rotates the motor Mb in the micro step driving in response to the release signal. As the motor Mb rotates, the second cam gear 117 rotates clockwise, and the second shutter unit becomes as illustrated in FIG. 22 through the state illustrated in FIG. 21. FIG. 21 illustrates a spring acceleration completion state of the second shutter unit. FIG. 22 illustrates a blade driving ready state of the second shutter unit. In this embodiment, the first shutter unit is in a runup state from the state in FIG. 20 to the state in FIG. 22. In this embodiment, in the cam area A in the cam groove 117b, a section (in which the second shutter unit is turned from the state in FIG. 20 to the state in FIG. 21) in which the second cam gear 117 is accelerated by the force by the second spring 118 will be referred to as an accelerating section. In the cam area A in the cam groove 117b, a section (in which the second shutter unit is turned from the state in FIG. 21 to the state in FIG. 22) in which the second cam gear 117 is not accelerated by the force by the second spring 118 will be referred to as a non-urging section.

When a positional shift is small between the electric signal and the second shutter unit in the runup state, the second shutter unit is positionally controlled by the motor Mb. Once the position of the second shutter unit is controlled, an exposure amount to the image pickup element IE can be controlled and thus the shutter accuracy can be improved. Hence, it is important to minimize the positional shift between the electric signal and the second shutter unit in the runup state. The controllability of the positional shift between the electric signal and the second shutter unit changes depending on a one-step pitch, and thus the positional shift becomes smaller as the pitch reduces. Hence, in the runup state, driving the motor Mb in the micro step driving in the runup section is very effective in improving the accuracy.

In the runup state, the second cam gear 117 rotates clockwise, the cam follower 119a is engaged with the first cam area A, thus the second driving lever 119 does not rotate, and the first blade group 106 is held in the opening state. Thus, a load applied to the motor Mb becomes very small in the runup state. The motor Mb can be driven without step-out in the micro step driving having a driving force smaller than that in the full state driving.

From the state in FIG. 20 to the state in FIG. 21, the second cam gear 117 is gradually accelerated by a predetermined driving frequency of the motor Mb and the force of the second spring 118, and an error reduces at the predetermined rotating speed. In addition, when the force of the second spring 118 is added to the driving force of the motor Mb, the second cam gear 117 having a large mass can be easily rotated at a high speed. In the state in FIG. 21, the second cam gear 117 is arranged at the same position as that in the state in FIG. 19 and rotating clockwise at the predetermined time. In the runup section, the motor Mb is driven in the micro step driving and rotated in synchronization with the coil electrification switching frequency, and thus the number of rotations reaches the desired number of rotations in the state in FIG. 22.

When the control circuit 13 reversely rotates the motor Mb in the state in FIG. 22, the second cam gear 117 clockwise rotates and the cam follower 119a slides in the second cam area B in the cam groove 117b. In other words, the second shutter unit becomes a blade driving state. Hence, as the first cam gear 107 rotates, the cam follower 119a slides in the second cam area B, and the second driving lever 119 rotates counterclockwise. As the second driving lever 119 rotates, the second blade arm 120 is driven and the second blade group 116 turns from the light shielding state to the opening state.

Since the motor Mb is driven in the micro step driving up to the state in FIG. 22, the speed of the second cam gear 117 is controlled to the desired rotating speed and the second cam gear 117 is rotated at a high speed. Where the second driving lever 119 rotates counterclockwise, a large load is applied to the motor Mb via the second cam gear 117. It is therefore necessary to increase a driving force of the motor Mb. The second cam gear 117 is integrated with the weight 117d, and has a sufficient inertia mass. The motor Mb can be stably driven without control as accurate as the micro step driving by converting the rotating momentum of the second cam gear 117 into the driving momenta for the second blade unit and the second driving lever 119.

The driving accuracy and speed of the second blade unit and the second driving lever 119 affect the rotational state of the second cam gear 117, such as a synchronization between a speed and an electric signal, when the second driving lever 119 starts rotating. However, after the second driving lever 119 rotates, the rotating driving force of the motor Mb is less affected.

Therefore, the control circuit 13 drives the motor Mb in the full step driving from the state illustrated in FIG. 22. The micro step driving is switched to the full step driving at the timings "a," "b," "c," and "d," in FIG. 7 before the second shutter unit is blade driving state or the second shutter has the runup state.

Figure 23:
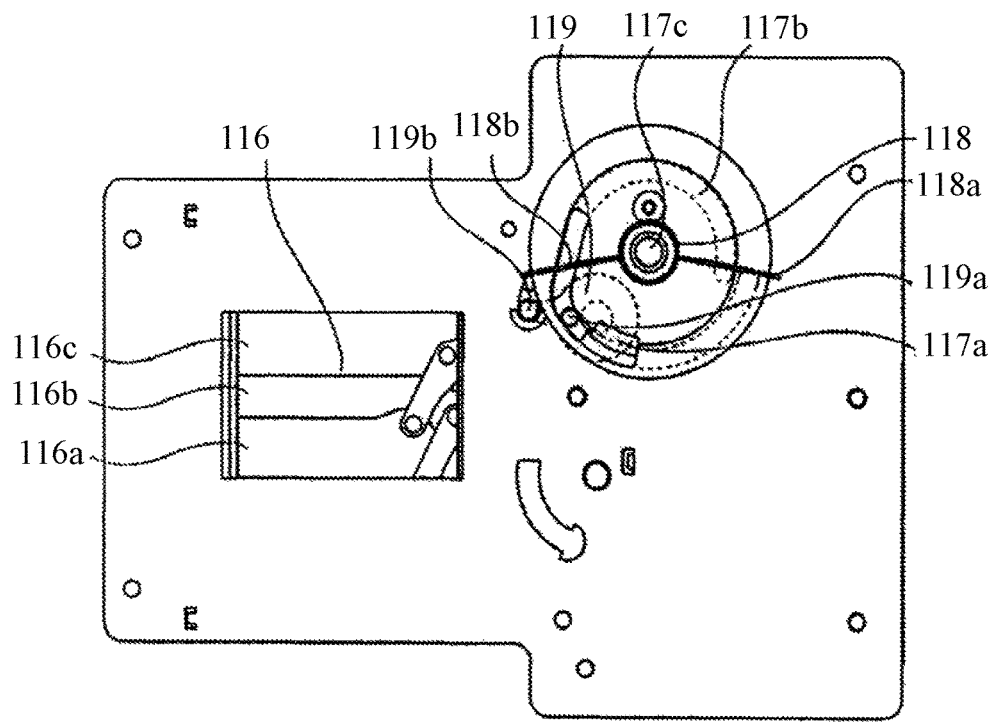
FIG. 23 illustrates a blade running completion state of the second shutter unit according to the first embodiment.

FIG. 23 illustrates a light shield state of the second blade group 116 or the blade running completion state of the second shutter unit. In this state, the cam follower 119a is engaged with the third cam area C in the cam groove 117b, and the second blade group 116 is held in the light shield state. In other words, the second shutter unit is in the deceleration state. In this embodiment, the decelerating state continues from FIG. 23 to FIG. 25.

It is unnecessary to accurately drive the second blade unit in the decelerating state, a large driving force is necessary for the deceleration, and the full step driving is effective. In the decelerating state, the cam follower 119a slides in the third cam area C that is formed concentrically to the rotating center of the second cam gear 117. Thus, even when the second cam gear 117 rotates, the second driving lever 119 does not rotate and the second blade group 116 is held in the light shield state.

Figure 24:
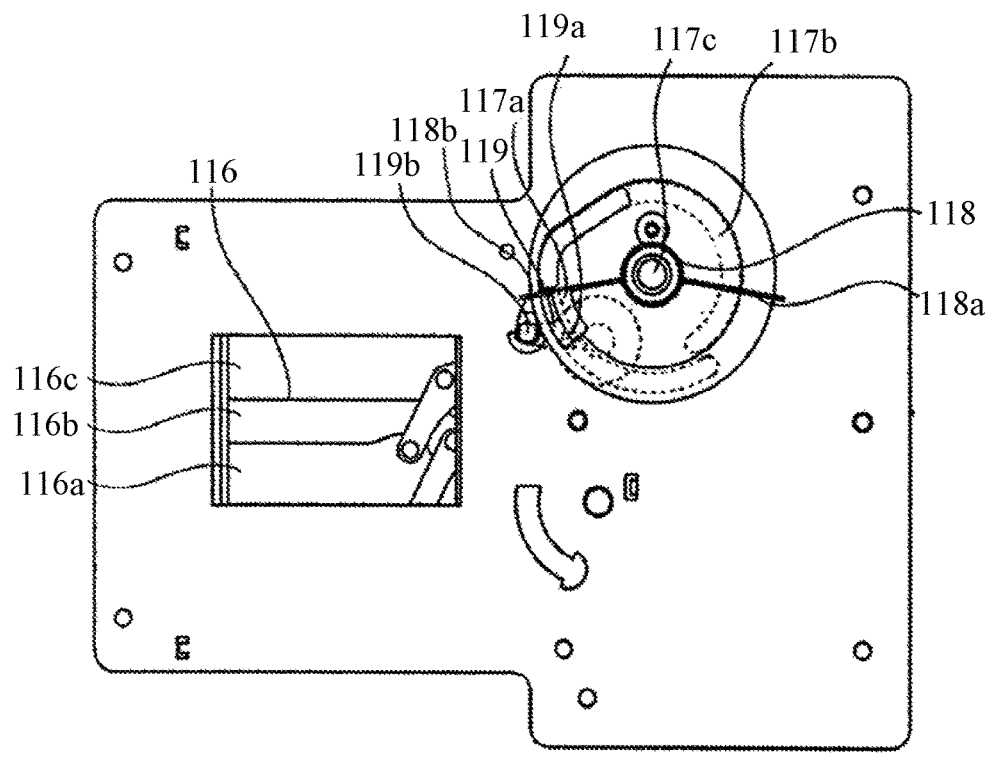
FIG. 24 illustrates a decelerating state in the second shutter unit according to the first embodiment.

In the state in FIG. 23, when the control circuit 13 reversely rotates the motor Mb in the full step driving, the second cam gear 117 rotates clockwise and the second shutter unit is in the state illustrated in FIG. 24. FIG. 24 illustrates a spring charge starting state in the deceleration state in the second shutter unit. In the state in FIG. 24, the projection 117a contacts the arm 118b in the second spring 118.

Figure 25:
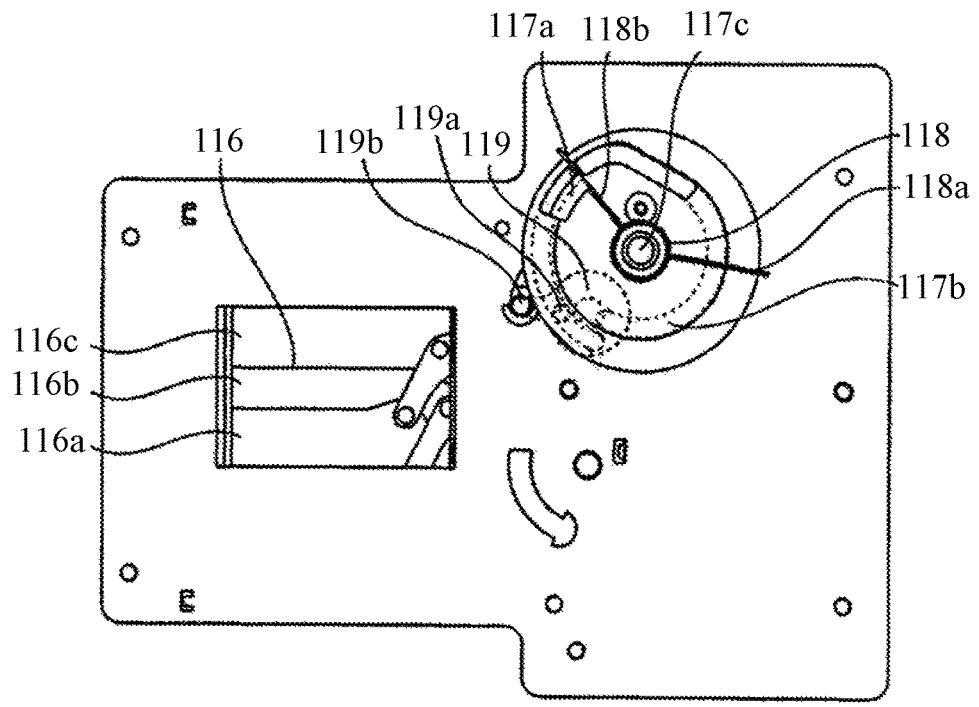
FIG. 25 illustrates a spring charge completion state in the decelerating state in the second shutter unit according to the first embodiment.

When the control circuit 13 reversely rotates the motor Mb in the full step driving in the state in FIG. 24, the second cam gear 117 rotates clockwise. At this time, the projection 117a charges the second spring 118. The projection 117a contacts a stopper (not illustrated), and the second shutter unit becomes as illustrated in FIG. 25. FIG. 25 illustrates a spring charge completion state in the decelerating state in the second shutter unit.

Figure 26:
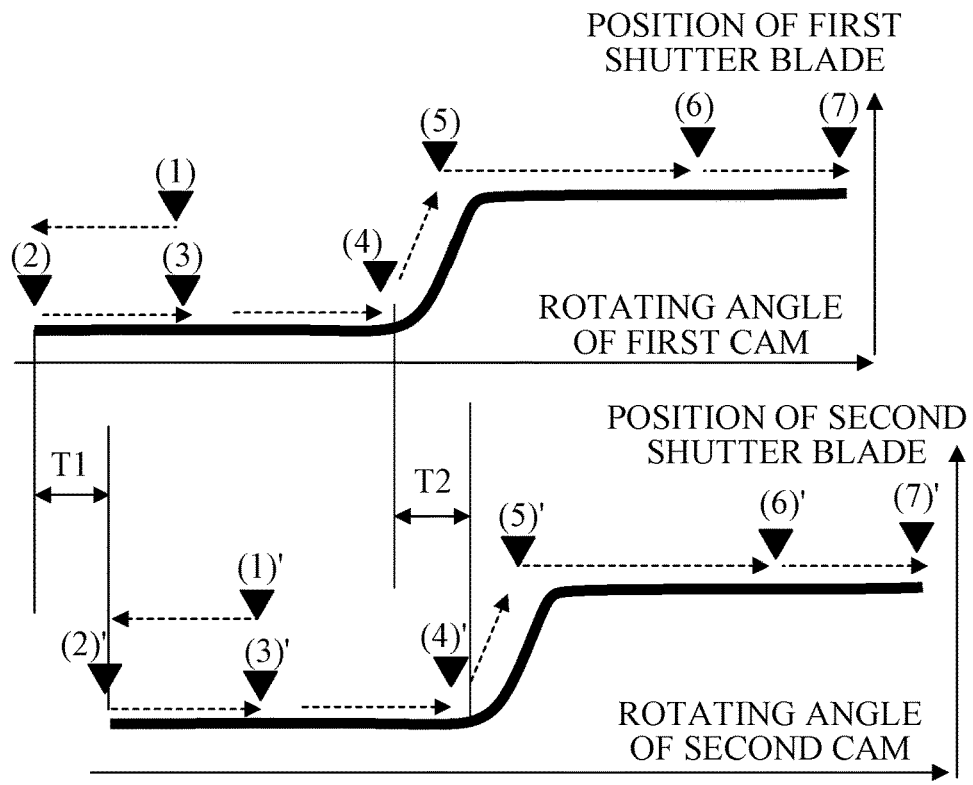
FIG. 26 explains a series of exposure operations of the first shutter unit and the second shutter unit according to the first embodiment.

Referring now to FIG. 26, a description will be given of a series of exposure operations of the first shutter unit and the second shutter unit. FIG. 26 explains the series of exposure operations of the first shutter unit and the second shutter unit. The upper graph in FIG. 26 illustrates an operation of the first blade unit for the rotating angle of the first cam gear 107. The abscissa axis denotes a rotating angle of the first cam gear 107, and the ordinate axis denotes a position of the first blade unit. The lower graph in FIG. 26 illustrates an operation of the second blade unit for the rotating angle of the second cam gear 117. The abscissa axis denotes a rotating angle of the second cam gear 117, and the ordinate axis denotes a position of the second blade unit.

In the upper graph in FIG. 26, states (1) to (7) of the first shutter unit correspond to the states in FIGS. 13 to 18. In the lower graph in FIG. 26, states (1)' to (7)' of the second shutter unit correspond to the states in FIGS. 19 to 25.

The control circuit 13 forwardly rotates the motors Ma and Mb in the full step driving, and changes the state (1) of the first shutter unit to the state (2) and the state (1)' of the second shutter unit to the state (2)'. When the first shutter unit turns from the state (1) to the state (2), the first spring 108 is charged. When the second shutter unit turns from the state (1)' to the state (2)', the second spring 118 is charged.

The first shutter unit stands by in the state (2) until the control circuit 13 receives the release signal. When the control circuit 13 receives the release signal, the control circuit 13 reversely rotates the motor Ma in the micro step driving and changes the first shutter unit to the state (4) through the state (3). At this time, the first cam gear 107 is sufficiently accelerated by the driving force from the motor Ma and the force of the first spring 108, and is clockwise rotated while the motor driving electric signal is in synchronization with the speed.

The control circuit 13 reversely rotates the motor Mb in the micro step driving predetermined time T1 determined in accordance with the luminance of the object after the motor Ma starts reversely rotating in the step (2), and changes the second shutter unit to the state (4)' through the state (3)'.

In this embodiment, while the first shutter unit turns from the state (2) to the state (4) and the second shutter unit turns from the state (2)' to the state (4)', the motors Ma and Mb are driven in the micro step driving but the present invention is not limited to this embodiment. Until the first shutter unit turns to the state (3), a rotating speed of the first cam gear 107 may reach a desired rotating speed due to the force of the first spring 108. In that case, after the step (3), the motor Ma needs not be highly accurately controlled in the micro step driving. In other words, while the first shutter unit turns from the state (2) to the state (3), the motor Ma may be driven in the micro step driving. Similarly, while the second shutter unit turns from the state (2)' to the state (3)', the motor Mb may be driven in the micro step driving.

After the first shutter unit turns to the state (4), the control circuit 13 reversely rotates the motor Ma in the full step driving and starts turning the first shutter blade into the opening state. Then, the first shutter unit turns to the state (5). At this time, the first shutter blade becomes the opening state.

After the second shutter unit turns to the state (4)', the control circuit 13 reversely rotates the motor Mb in the full step driving and starts turning the second shutter blade into the light shield state. Then, the second shutter unit turns to the state (5)'. At this time, the second shutter blade becomes the light shield state. The second shutter blade starts turning into the light shield state later by predetermined time T2 than the first shutter blade starts turning into the opening state. In other words, the predetermined time T2 is an exposure time period for the image pickup element IE. When the motors Ma and Mb have the same operational characteristics, the same acceleration characteristics, and the same acceleration signals, the predetermine time T1 is equal to the predetermined time T2.

After the first shutter unit turns to the state (5), the control circuit 13 reversely rotates the motor Ma in the full step driving and changes the first shutter unit to the state (7) via the state (6). While the first shutter unit turns from the state (6) to the state (7), the first spring 108 is charged.

After the second shutter unit turns to the state (5)', the control circuit 13 reversely rotates the motor Mb in the full step driving and changes the second shutter unit to the state (7)' via the state (6)'. While the second shutter unit turns from the state (6)' to the state (7)', the second spring 118 is charged.

When a release signal for the next frame is continuously input, turning from the state (7)' to the state (2)' of the second shutter unit starts first. Next, a predetermined time after the second shutter unit starts operating, the first shutter unit turns from the state (7) to the state (2). While the first shutter unit turns from the state (7) to the state (5) and the second shutter unit turns from the state (7)' to the state (5)', the motors Ma and Mb are driven in the micro step driving. While the first shutter unit turns from the state (5) to the state (2) and the second shutter unit turns from the state (5)' to the state (2)', the motors Ma and Mb are driven in the full step driving.

Second Embodiment

A focal plane shutter according to this embodiment has the same structure as that of the focal plane shutter according to the first embodiment, and a description of only the difference will be described.

The focal plane shutter according to this embodiment executes the micro step driving with an effective voltage Va and the full step driving with an effective voltage Vb lower than the effective voltage Va.

Figure 27:
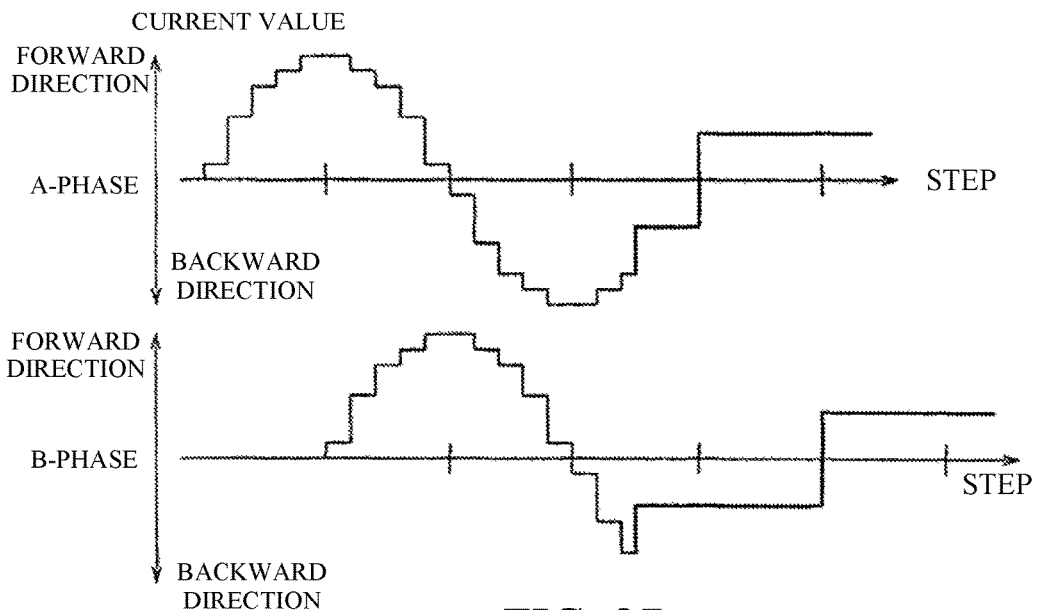
FIG. 27 illustrates an illustrative relationship between the number of steps and the electrified current in the coil when the micro step driving is switched to the full step driving according to a second embodiment.

FIG. 27 illustrates a relationship between the number of steps and the electrified current in the coil when the micro step driving is switched to the full step driving at the timing "c" in FIG. 7.

Herein, the focal plane shutter according to the first embodiment uses the energy stored in the runup section to drive the blade unit, and thus the energy stored in the runup section is dominant for the shutter accuracy. Hence, even when the effective voltage Vb for the full step driving is set lower than the effective voltage Va for the micro step driving, the shutter accuracy is less affected.

This setting can make smaller the maximum current in the full step driving than that in the micro step driving, as illustrated in FIG. 27, and achieve power saving.

The effective voltage Vb may be set for the effective voltage Va by lowering the applied voltage or by reducing the effective voltage through PWM driving.

Third Embodiment

A focal plane shutter according to this embodiment has the same structure as that of the focal plane shutter according to the first embodiment, and a description of only the difference will be described.

The focal plane shutter according to this embodiment executes the micro step driving with an effective voltage Va and the full step driving with an effective voltage Vc.

Figure 28:
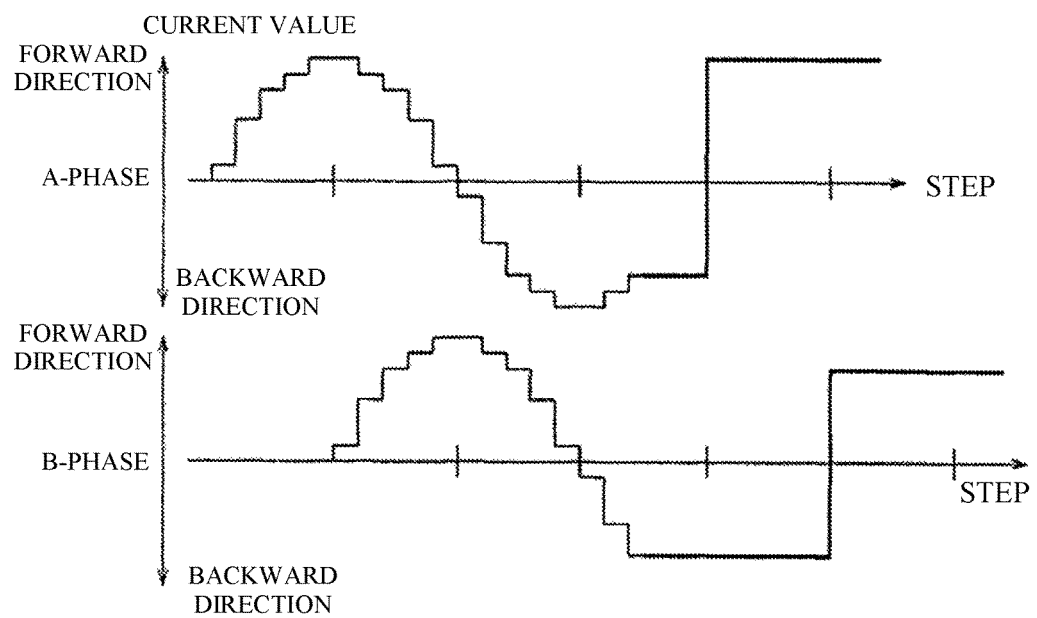
FIG. 28 illustrates an illustrative relationship between the number of steps and the electrified current in the coil when the micro step driving is switched to the full step driving according to a third embodiment.

FIG. 28 illustrates a relationship between the number of steps and the electrified current in the coil when the micro step driving is switched to the full step driving at the timing "c" in FIG. 7.

If it is assumed that Vd is the effective voltage at the timing "c" in FIG. 7, the motor is driven with the effective voltage Vc equal to the effective voltage Vd in the full step driving.

When the micro step driving is switched to the full step driving and the current value abruptly changes, the driving force for driving the blade unit abruptly changes and the shutter accuracy may be affected. Accordingly, driving can be changed while the driving force continuity is maintained for driving the blade unit by changing the micro step driving to the full step driving without changing the electrified current. Therefore, the blade unit can be smoothly driven without affecting the shutter accuracy.

The effective voltage Vc may be set for the effective voltage Va by lowering the applied voltage or by reducing the effective voltage through the PWM driving.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-051134, filed on Mar. 16, 2017, which is hereby incorporated by reference herein in its entirety.

What is claimed is:

1. A shutter apparatus comprising:
    a motor configured to drive in a full step driving mode that electrifies each phase with a constant electrification amount, and a micro step driving mode that stepwise changes an electrification amount and electrifies each phase;

a cam gear connected to an output shaft of the motor and including a cam part;
a driving member including a cam follower configured to slide in the cam part; and
a blade group configured to move between an open state that opens an opening used for an exposure and a closed state that closes the opening, via the cam gear and the driving member as the motor rotates,
wherein the cam part includes a blade maintaining section configured to maintain one of the open state and the closed state of the blade group when the cam follower slides, and a blade driving section configured to move the blade group from the one of the open state and the closed state to the other of the open state and the closed state when the cam follower slides, and
wherein where the cam follower slides in the blade maintaining section and the blade driving section in this order, the motor is driven in the micro step driving mode when the cam follower slides in the blade maintaining section, and the motor is driven in the full step driving mode when the cam follower slides in the blade driving section.

2. The shutter apparatus according to claim 1, wherein the blade maintaining section includes a runup section that maintains the one of the open state and the closed state of the blade group when the cam follower slides, and a decelerating section that maintains the other of the open state and the closed state of the blade group when the cam follower slides,
wherein the cam part includes the runup section, the blade driving section, and the decelerating section in this order, and
wherein as the cam follower slides in the runup section, the blade driving section, and the decelerating section in this order, the motor is driven in the micro step driving mode when the cam follower slides in the runup section, and the motor is driven in the full step driving mode when the cam follower slides in the blade driving section and the decelerating section.

3. The shutter apparatus according to claim 1, further comprising an urging member that urges the cam gear,
wherein the blade maintaining section has an accelerating section in which the urging member accelerates a rotation of the cam gear, and a non-urging section in which the urging member does not urge the cam gear, and
wherein where the cam follower slides in the accelerating section, the non-urging section, and the blade driving section in this order, the motor is driven in the micro step driving mode when the cam follower slides in the accelerating section, and the motor is driven in the full step driving motor when the cam follower slides in the non-urging section and the blade driving section.

4. The shutter apparatus according to claim 1, wherein the motor is driven in the micro step driving mode with a first effective voltage and in the full step driving mode with a second effective voltage lower than the first effective voltage.

5. The shutter apparatus according to claim 1, wherein the motor is driven in the micro step driving mode with a first effective voltage and in the full step driving mode with a second effective voltage lower than the first effective voltage,
wherein an effective voltage for each phase is equal to each other with a predetermined phase in the micro step driving mode, and
wherein the second effective voltage is equal to an effective voltage with the predetermined phase.

6. The shutter apparatus according to claim 1, further comprising a controller configured to control driving of the motor.

7. An image pickup apparatus comprising:
a motor configured to drive in a full step driving mode that electrifies each phase with a constant electrification amount, and a micro step driving mode that stepwise changes an electrification amount and electrifies each phase;
a cam gear connected to an output shaft of the motor and including a cam part;
a driving member including a cam follower configured to slide in the cam part; and
a blade group configured to move between an open state that opens an opening used for an exposure and a closed state that closes the opening, via the cam gear and the driving member as the motor rotates,
wherein the cam part includes a blade maintaining section configured to maintain one of the open state and the closed state of the blade group when the cam follower slides, and a blade driving section configured to move the blade group from the one of the open state and the closed state to the other of the open state and the closed state when the cam follower slides, and
wherein where the cam follower slides in the blade maintaining section and the blade driving section in this order, the motor is driven in the micro step driving mode when the cam follower slides in the blade maintaining section, and the motor is driven in the full step driving mode when the cam follower slides in the blade driving section.

8. A control method for a shutter apparatus that includes a motor configured to drive in a full step driving mode that electrifies each phase with a constant electrification amount, and a micro step driving mode that stepwise changes an electrification amount and electrifies each phase, a cam gear connected to an output shaft of the motor and including a cam part, a driving member including a cam follower configured to slide in the cam part, and a blade group configured to move between an open state that opens an opening used for an exposure and a closed state that closes the opening, via the cam gear and the driving member as the motor rotates, wherein the cam part includes a blade maintaining section configured to maintain one of the open state and the closed state of the blade group when the cam follower slides, and a blade driving section configured to move the blade group from the one of the open state and the closed state to the other of the open state and the closed state when the cam follower slides, the control method comprising the steps of:
driving the motor in the micro step driving mode when the cam follower slides in the blade maintaining section; and
driving the motor in the full step driving mode when the cam follower slides in the blade driving section.

* * * * *